Aug. 10, 1965 G. R. ANDERSON ETAL 3,199,558
FRUIT STEMMING, CORING AND SPLITTING MACHINE
Filed Sept. 4, 1962 9 Sheets-Sheet 1
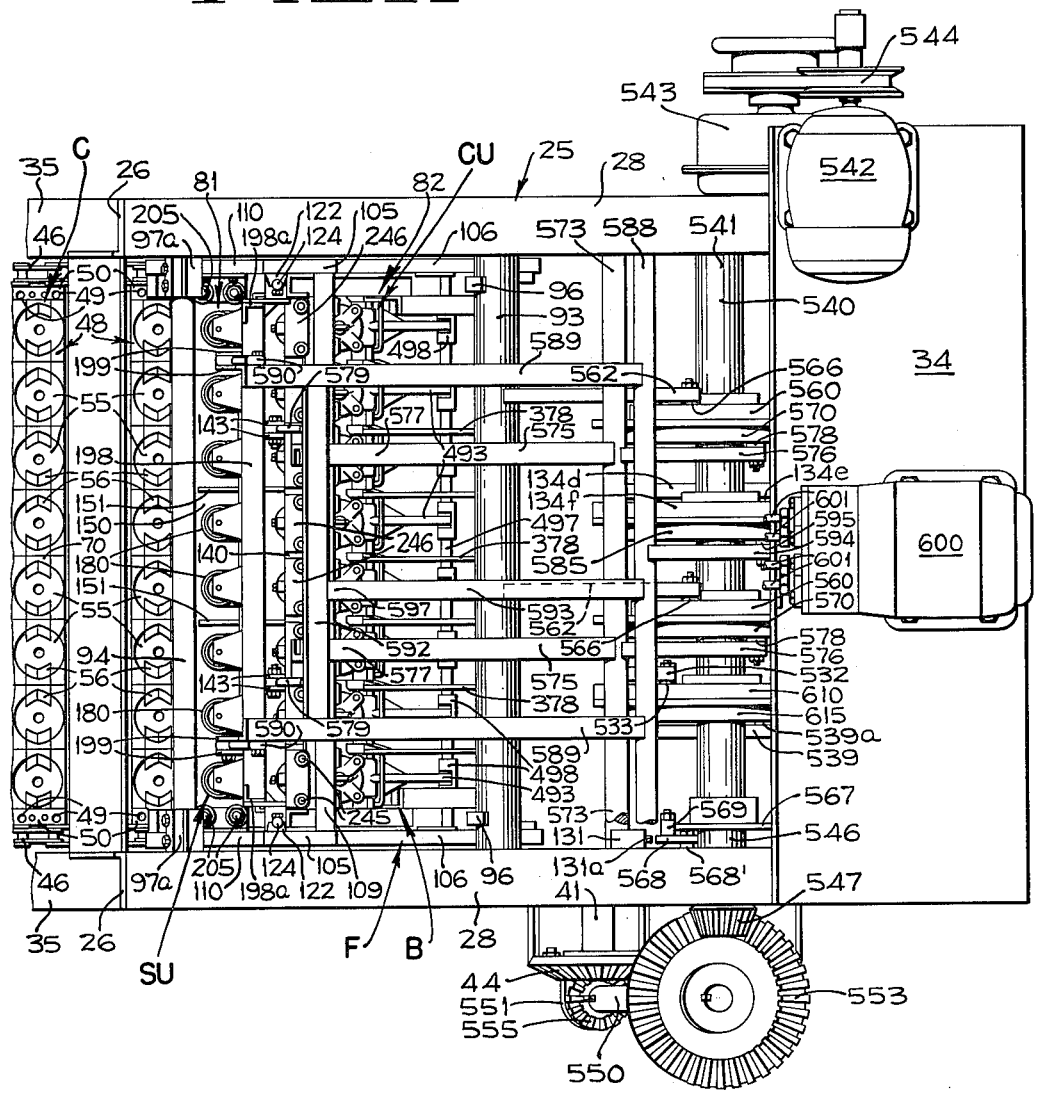
FIG_1
INVENTORS
GERALD R. ANDERSON
SHERMAN H. CREED
BY
ATTORNEY

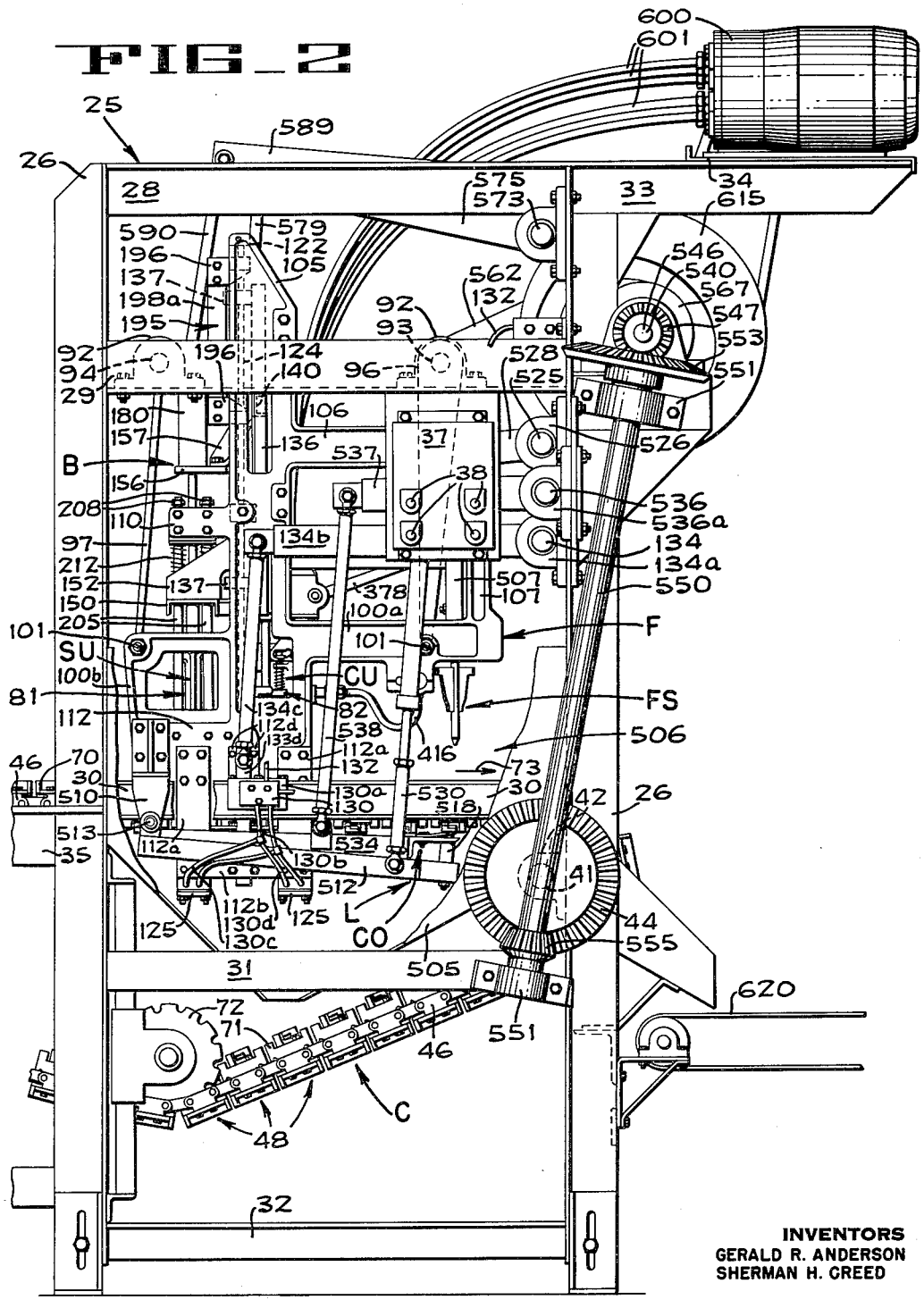

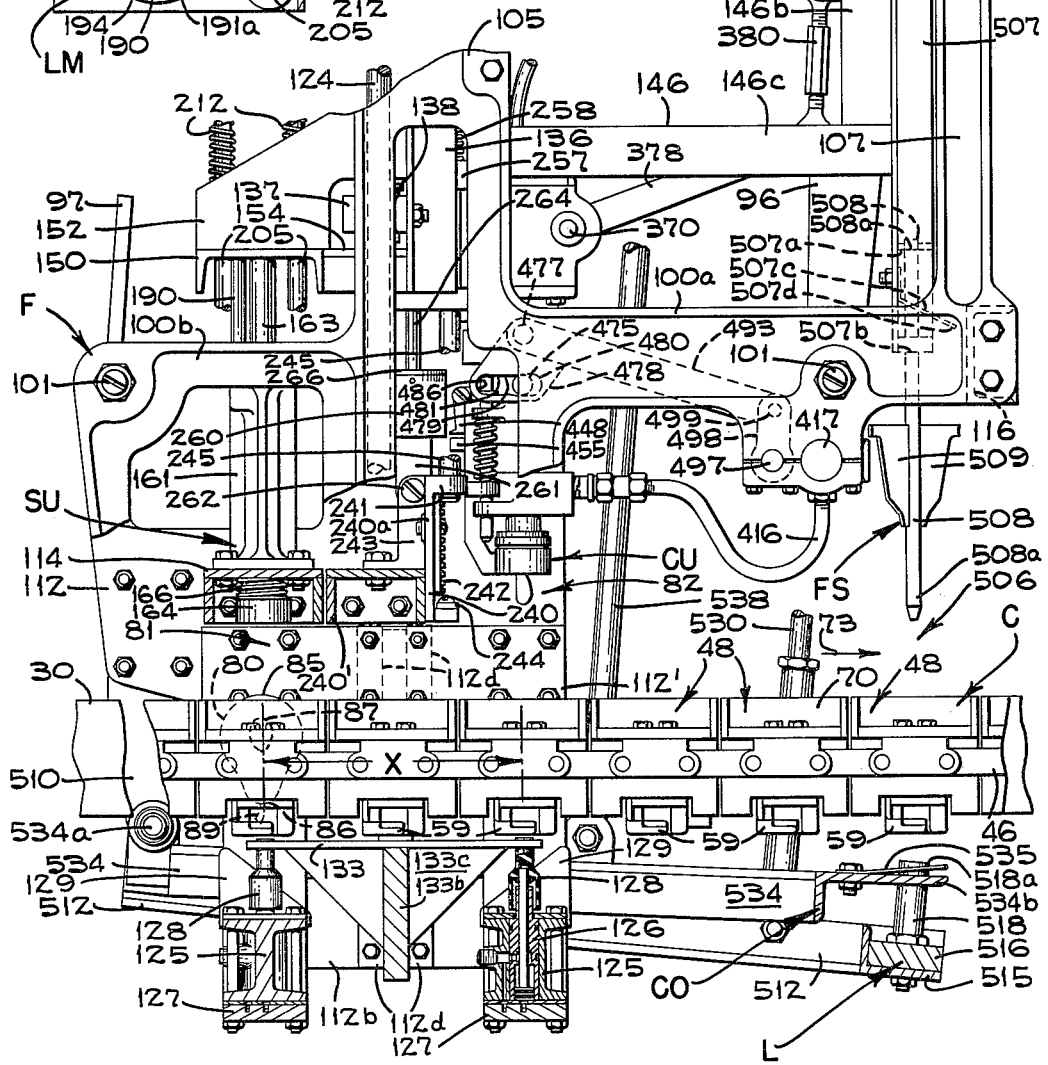

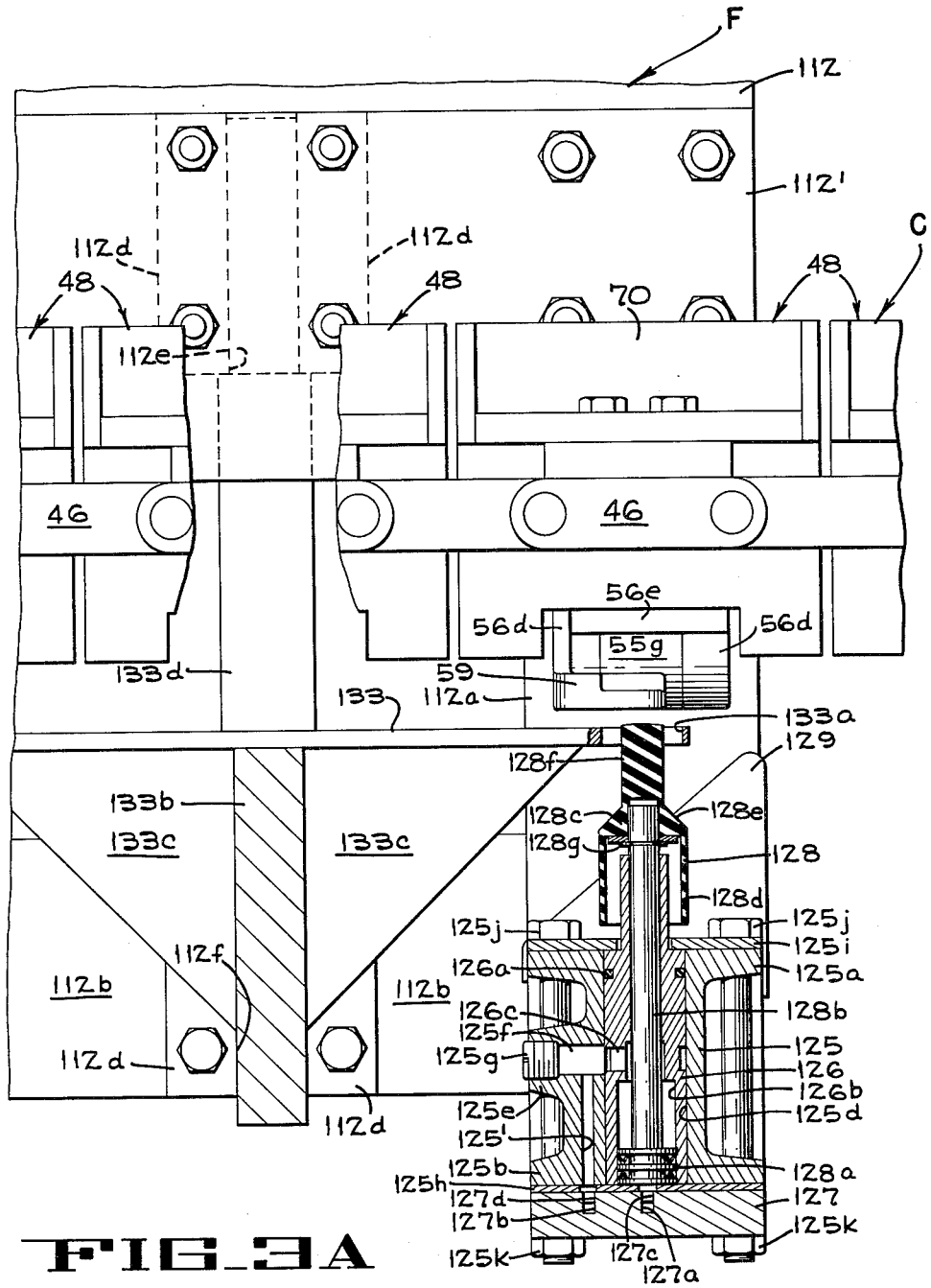

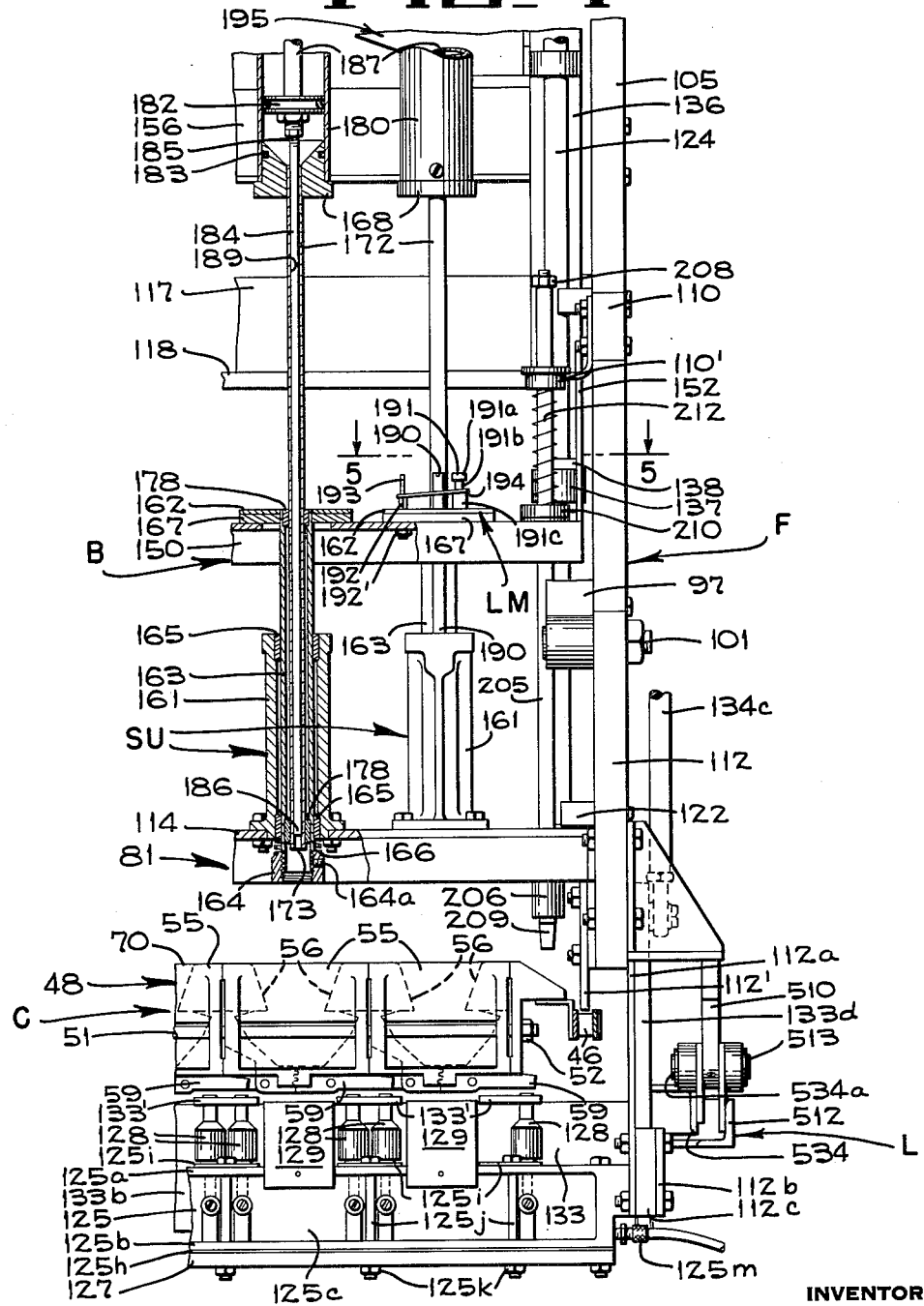

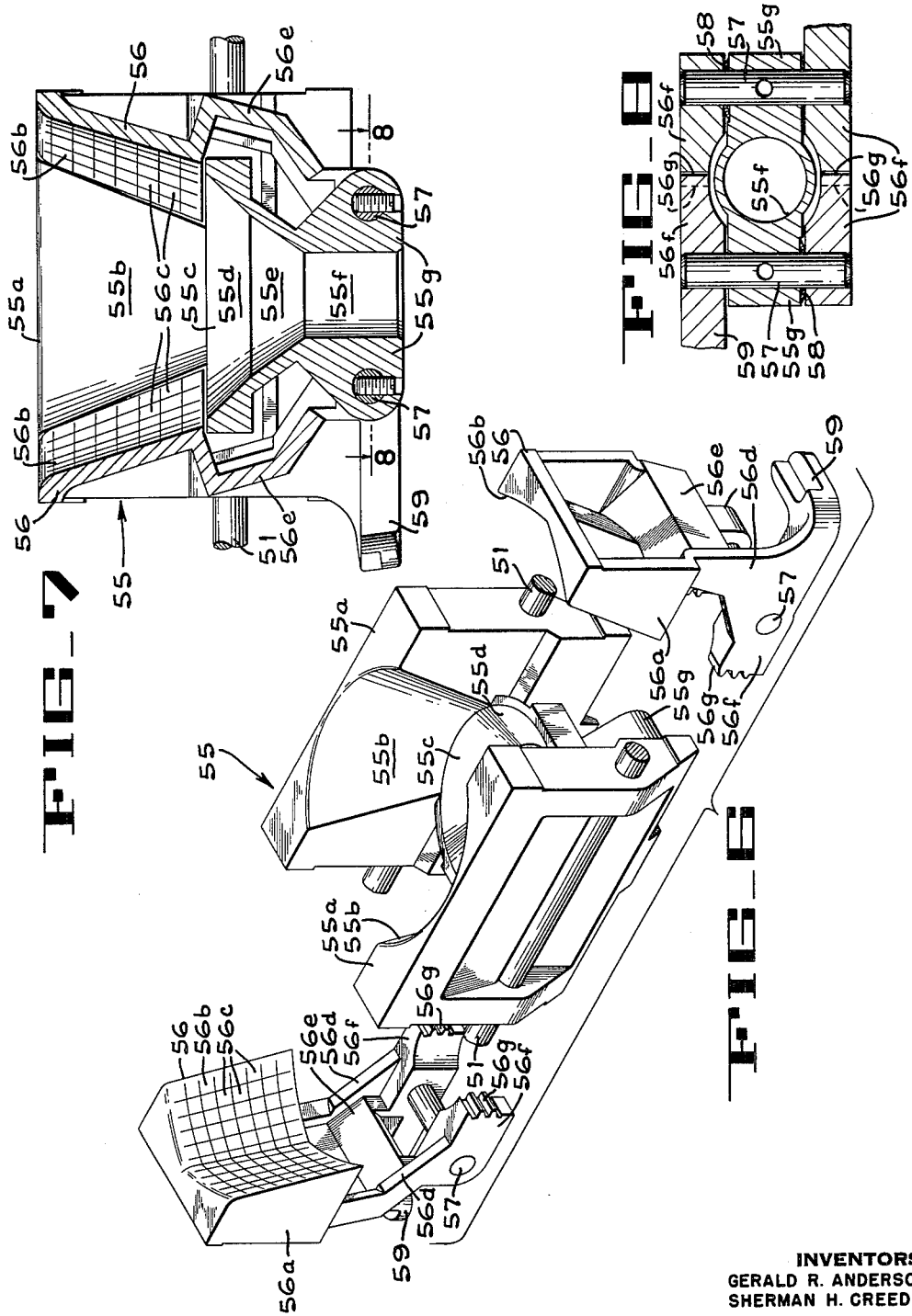

Aug. 10, 1965    G. R. ANDERSON ETAL    3,199,558
FRUIT STEMMING, CORING AND SPLITTING MACHINE
Filed Sept. 4, 1962    9 Sheets-Sheet 7
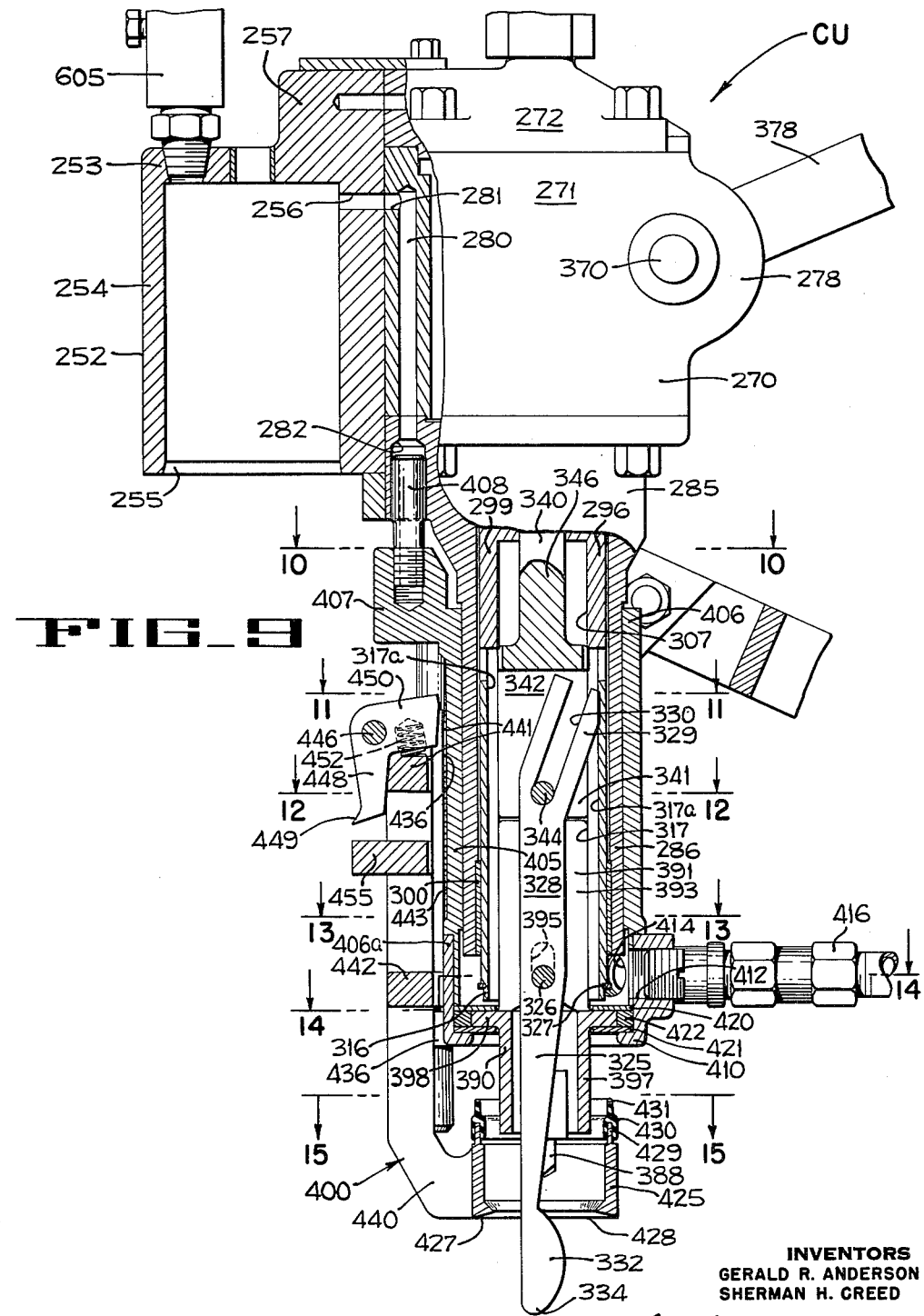
FIG_9
INVENTORS
GERALD R. ANDERSON
SHERMAN H. CREED
BY Hans G. Hoffmeister
ATTORNEY

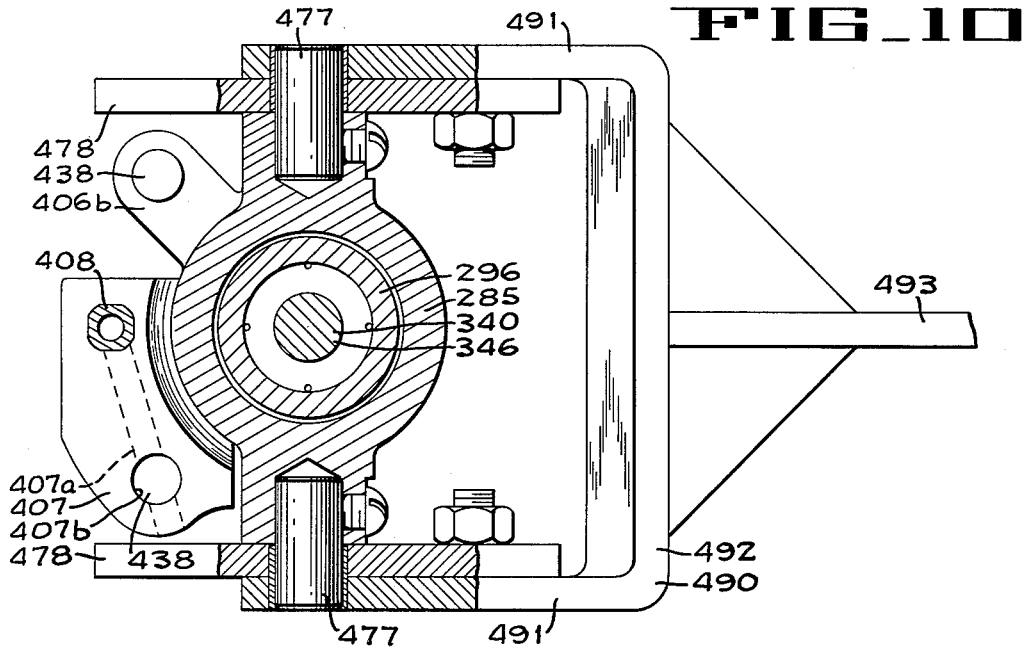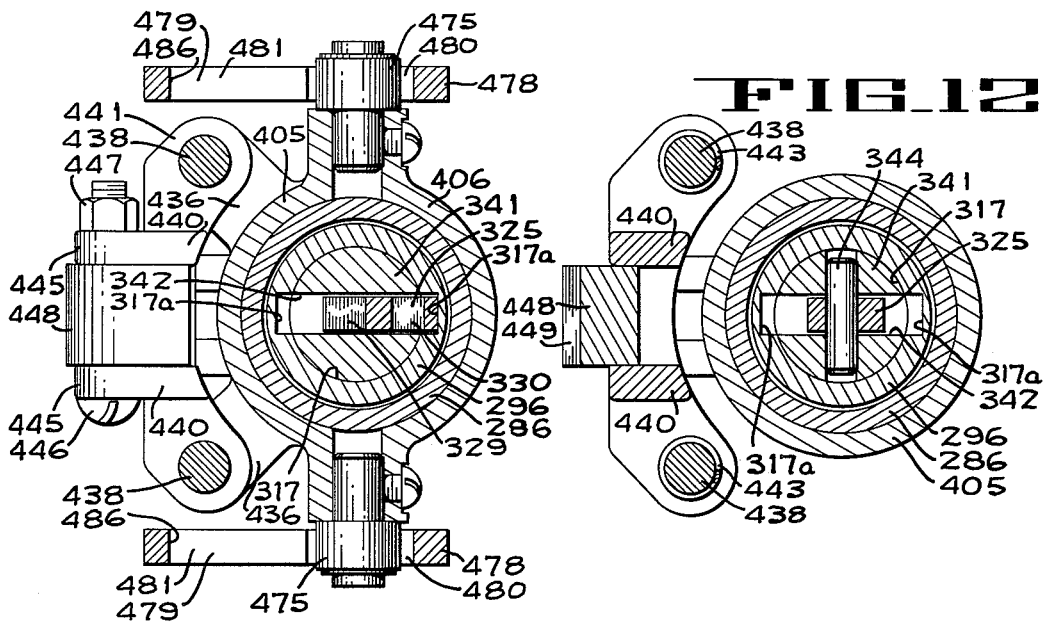

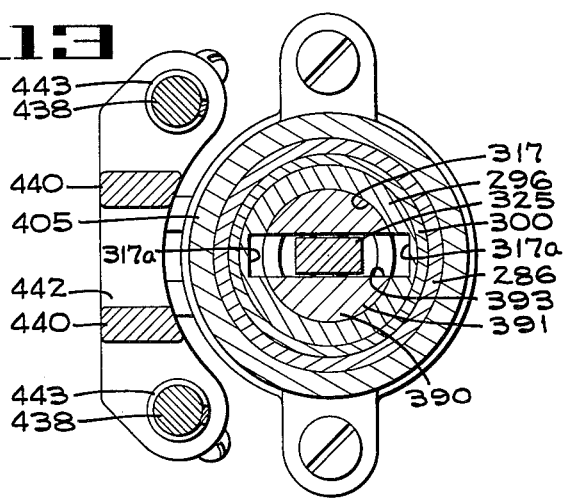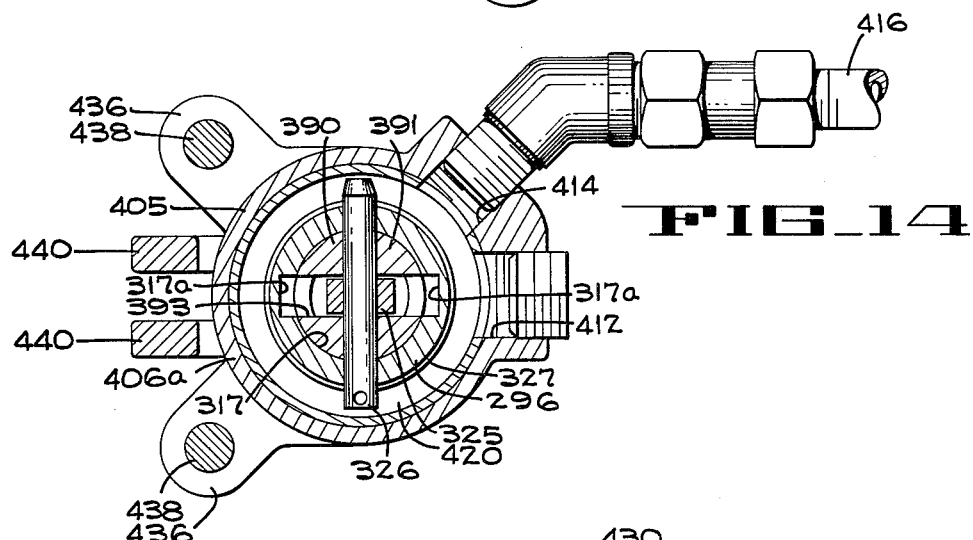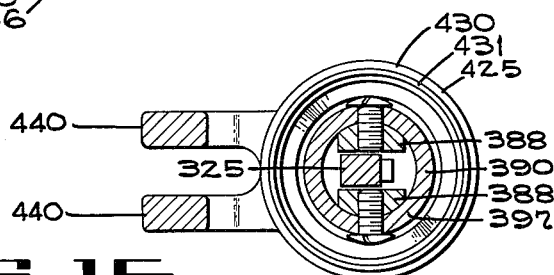

United States Patent Office 3,199,553
Patented Aug. 10, 1965

3,199,553
FRUIT STEMMING, CORING AND SPLITTING MACHINE
Gerald R. Anderson, Campbell, and Sherman H. Creed, San Jose, Calif., assignors to FMC Corporation, San Jose, Calif., a corporation of Delaware
Filed Sept. 4, 1962, Ser. No. 221,174
33 Claims. (Cl. 146—52)

The present invention pertains to an apparatus for processing fruit and, more particularly, to an apparatus for stemming, coring, and splitting fruit accurately and without damaging the fruit.

The apparatus of the present invention pertains to further developments in certain portions in the apparatus disclosed in the pending application of Gerald R. Anderson, titled Method and Apparatus for Processing Fruit, Serial No. 206,955, filed July 2, 1962 and assigned to the same assignee as the present application.

It is an object of the present invention to provide an apparatus for stemming, coring and splitting fruit in an accurate manner and without damaging the fruit.

Another object is to provide a conveyor for orienting fruit in a predetermined position prior to and during stemming, coring, and splitting of the fruit and for releasing the fruit following processing thereof.

Another object is to provide a fruit processing apparatus which facilitates withdrawal of a stemming tube from fruit subsequent to the stemming thereof.

Another object is to provide a fruit coring unit which minimizes impact with and imposition of weight on the fruit during the coring operation.

Another object is to provide a mechanism for controlling the extent of entry of a coring knife into fruit-to-be-cored while minimizing contact of said mechanism with the fruit.

Another object is to provide a fruit processing apparatus which splits the fruit subsequent to stemming and coring and which does not damage the fruit conveyor as a result of such splitting.

Another object is to provide a fruit processing apparatus in which the fruit orienting, stemming, coring, splitting and other operations of the apparatus are performed in timed relation whereby the fruit is processed with care and accuracy.

These, together with other objects, will become apparent upon reference to the following description and accompanying drawings, in which:

FIG. 1 is a schematic plan of a fruit processing apparatus embodying the principles of the present invention.

FIG. 2 is a side elevation of the apparatus illustrated in FIG. 1 with the parts being broken away to show an oscillatory carrier frame and portions of stemming and coring units mounted on said carrier frame.

FIG. 3 is an enlarged, fragmentary vertical longitudinal section of the apparatus of FIG. 1 with parts being broken away to show, in particular, a fruit conveyor and fluid operated rams for closing movable jaw walls of the cups of the conveyor.

FIG. 3A is a still further enlarged, fragmentary vertical longitudinal section showing the fluid operated rams in greater detail.

FIG. 4 is an enlarged, fragmentary, vertical transverse section of the apparatus of FIG. 1 illustrating, in particular, the stemming units and latching mechanism which facilitates withdrawal of the stemming tube from the fruit subsequent to the stemming thereof.

FIG. 5 is a fragmentary horizontal section taken on line 5—5 in FIG. 4.

FIG. 6 is an enlarged, exploded isometric of one of the fruit orienting cups of the conveyor illustrated in FIG. 1 and showing portions of the tie rods used for mounting the cups in a flight of the conveyor.

FIG. 7 is an enlarged section of one of the conveyor cups taken lengthwise of a flight and also showing portions of the flight tie rods.

FIG. 8 is a fragmentary section taken on a plane at a position indicated by line 8—8 in FIG. 7.

FIG. 9 is a still further enlarged, fragmentary side elevation of a coring unit, as illustrated in FIG. 3, with portions being broken away and in section to show internal details of construction.

FIG. 10 is an enlarged, transverse section taken on a plane at a position indicated by line 10—10 in FIG. 9, it being noted in FIGS. 10–13 that the structure shown is restricted substantially to the plane of their respective sections.

FIG. 11 is an enlarged, transverse section taken on a plane at a position indicated by line 11—11 in FIG. 9.

FIG. 12 is an enlarged, transverse section taken on a plane at a position indicated by line 12—12 in FIG. 9.

FIG. 13 is an enlarged, transverse section taken on a plane at a position represented by line 13—13 in FIG. 9.

FIG. 14 is an enlarged, transverse section taken on a plane at a position indicated by line 14—14 in FIG. 9.

FIG. 15 is an enlarged, transverse section taken on a plane at a position indicated by line 15—15 in FIG. 9.

Before describing the detailed structure of the present apparatus, it will be helpful to point out certain main components of the apparatus and their general association. Thus, with reference to FIGS. 2 and 3, a fruit supply conveyor C continuously conveys fruit 80 past stemming and coring stations 81 and 82 in the direction of arrow 73. A carrier frame F swings fore and aft above the conveyor in timed relation to the conveyor and mounts a main support bracket B which moves up and down in timed relation to the movements of the carrier frame. A stemming unit SU is mounted on the main support bracket and thus moves upwardly and downwardly with this bracket so as to stem fruit at the stemming station. A coring unit CU is supported by the main support bracket which lowers the coring unit at the coring station into coring position in a stemmed fruit and subsequently lifts the coring unit into retracted position. After the fruit is cored, it is discharged by the conveyor, but, just prior to discharge, it is split into segments by a fruit splitter FS and then is unseated from the conveyor by a fruit lifter L.

Referring in greater detail to the drawings and to the subject apparatus, a main frame 25 (FIGS. 1 and 2) is provided having pairs of front and rear legs 26 (FIG. 2) on opposite sides of the frame. The frame also provides horizontal upper side braces 28; intermediate side braces 29, 30 and 31; and lower side braces 32 which rigidly interconnect front and rear legs on corresponding sides of the frame. The upper braces include forwardly projecting motor support portions 33, and a horizontal platform 34 is mounted on these support portions. The frame also includes a conveyor support portion 35, which is only partially illustrated at the lower left in FIG. 2. In actual embodiments of the present invention, the conveyor support portion projects rearward from the rear legs a distance equal to about twice the distance between the front and rear legs of the frame. It is also to be noted that a control panel 37 is attached to the side brace 29 and provides controls 38 for the various apparatus of the present invention.

*Conveyor*

The fruit supply conveyor C (FIGS. 1, 2 and 3) is mounted in the frame 25 and includes a substantially horizontal, forward drive shaft 41 (FIG. 2) journalled in bearings 42 secured to the front legs 26. The drive shaft is extended transversely of the frame and is vertically spaced between the intermediate braces 30 and 31. A driven bevel gear 44 is secured to an end of the drive shaft, and front sprockets, not shown, are keyed to opposite end portions of the drive shaft. Endless chains 46 are trained around the front sprockets and also around rear sprockets, not shown, the latter being mounted on a rear shaft, not shown, but supported on the conveyor support portion 35 in rearwardly spaced relation to the rear legs 26. Elongated flights 48 (FIG. 1) interconnect the chains and extend transversely of the frame, with each flight having a pair of aligned holes 49 in end brackets 50 of the flights.

Each flight 48 of the fruit conveyor C includes a row of fruit supporting and orienting cups 55 dependably mounted in uniformly spaced relation between the end brackets 50 by tie rods 51 extending through the cups 55 and having opposite ends passing through the end brackets and connected thereto by nuts 52. Considering all of the flights, there are a plurality of lanes of cups with each lane including longitudinally aligned cups of the several flights and with the spacing between adjacent cups in each lane being substantially the same. The illustrated embodiment of the subject invention provides eight lanes of cups, but it is to be understood that the invention is not limited to this number of lanes nor even to a plurality of lanes.

The construction of each cup 55 is of significance in the present invention and is best illustrated in FIGS. 6, 7 and 8. Thus, each cup has a pair of spaced, confronting main side walls 55a individually mounted on the flight tie rods 51. Each side wall has an upper recess 55b shaped like the segment of a frusto-cone and concentric with an upright axis for the cup. Each cup also has a lower bowl portion 55c that is integral with and extends between the side walls and is also concentric with said cup axis. Specifically, the bowl portion has upper and intermediate frusto-conical surfaces 55d and 55e and a lower cylindrical bore 55f. Lower bosses 55g project in opposite directions from the bowl portion and are disposed lengthwise of the flight; further, the bosses protrude below the main side walls.

Further, each of the fruit centering and supporting cups 55 has a pair of movable jaw walls 56 pivotally connected to the bosses 55g for pivotal movement between the main side walls 55a. Each jaw wall has opposite side surfaces 56a, an inner angulated gripping surface 56b that resembles the surface of a waffle iron in that it provides a plurality of equally spaced studs 56c projecting inwardly of the cup, and downwardly projecting mounting portions 56d interconnected by webs 56e. The jaw walls are individually positioned between the main side walls on opposite sides of the bowl portion 55c and with the bosses 55g being respectively fitted between the mounting portions 56d. Pins 57 are extended through the interfitted mounting portions and bosses so as to mount the jaw walls for pivotal movement with respect to the main side walls. Cup-shaped washers 58 (FIG. 8) encircle the pins and bear against the bosses and the mounting portions. These washers are resiliently compressible axially of the pins and resist pivotal movement of the jaw walls. The result is that the jaw walls remain in whatever positions they are placed, but the washers yield to permit pivotal movement of the jaw walls upon application of sufficient pivoting force. The mounting portions of the jaw walls have inwardly directed segments 56f on which are formed gear teeth 56g. The gear teeth of the mounting portions on corresponding sides of the cup are in mesh so that when one of the jaw walls is pivoted, the other jaw wall pivots in a corresponding direction. Further, actuating arms 59 project outwardly, that is lengthwise of the flight, from one of the mounting portions of each jaw wall, it being noted that the actuating arms for each cup are on opposite sides of such cup.

It will be evident from the foregoing that the jaw walls 56 are unitarily pivotable between gripping positions wherein they form a generally frusto-conical fruit receiving socket with the recesses 55b and the bowl portion 55c and retracted positions spaced outwardly from their gripping positions. In their gripping positions, it will be noted in FIG. 7 that the webs 56e are spaced outwardly from the gripping surfaces 56b so as to accommodate the bowl portions 55c and to permit sufficient inward movement of the gripping surfaces so that smaller as well as larger pears can be dependably gripped by the jaw walls 56. It will be evident that the jaw walls are moved into their gripping positions by applying upward pressure on the actuating arms 59, and that the jaw walls are moved into their retracted or open positions by applying upward pressure on the inner segments 56f inwardly of the pivot pins 57, all in a manner to be subsequently described. The waffle-iron type construction of the gripping surfaces enables the jaw walls to hold the pears firmly in centered positions, to resist rotation of the pears during coring, and yet to permit the pears to be slid downwardly into the bowl portion during seating of the pears, as will be described, all without damage to the pears. It is to be noted that the angle of the intermediate surface 55e is preferably approximately 35° with respect to the vertical since this angle facilitates centering of the pears; however, an angle greater than 35° is preferable for the upper surface 55d since it allows the stem ends of larger pears to be fitted down onto the intermediate surface.

Returning now to other features of the fruit conveyor C (FIG. 2), it has an upper horizontal run 70 positioned between the intermediate side braces 30 and a lower run 71 extending rearward from the front sprockets around a chain tightener 72 (FIG. 2) to the rear sprockets, not shown, on the support portion 35. The conveyor is driven, in a manner to be described, so as to move the upper run in a forward direction, as indicated by the arrow 73.

The upper run 70 of the described conveyor C is employed to carry fruit 80 (FIG. 3) past stemming and coring stations 81 and 82, respectively, (FIGS. 2 and 3) above the conveyor. Although the principles of the subject invention are applicable to various fruits, the present embodiment is conveniently described as applied to the stemming and coring of pears. For identification and subsequent reference, each pear (FIG. 3) to be processed has a blossom or butt end 85, an opposite stem end 86, an internal seed cell 87 located within a core cavity or pocket, and a stem 89. The pears are individually supported in the cups 55 with their stem ends down. If the stem ends of these pears are sufficiently narrow, they project through the openings 55f.

It is of interest to note that in actual practice of the subject invention, the pears 80 are peeled before being stemmed and cored and are automatically fed into the cups 55. However, the pears need not be peeled for the subject stemming and coring operations to be performed and the pears can be manually placed in the cups by attendants standing alongside of the conveyor support portion 35 (FIG. 1). Also, as each pear travels on the conveyor toward the stemming station 81, it usually lies against one of the cup walls with its stem blossom axis slightly inclined with respect to the vertical axis of the cup. By closing the jaw walls 56, in a manner to be subsequently described, each pear is moved into coaxial alignment with its cup axis prior to, and is maintained in such alignment during the stemming and coring operations.

Carrier frame

The carrier frame F (FIG. 2) is supported by the main frame 25 above the upper run 70 of the fruit conveyor C for forward and rearward oscillating movement. The carrier frame extends the full width of the conveyor and is located above the stemming and coring stations 81 and 82. For supporting the carrier frame, front and rear pairs of pillow blocks 92 are mounted on the intermediate side braces 29 and the blocks of each pair being in alignment with each other. Parallel front and rear rock shafts 93 and 94 are journalled respectively in the front and rear blocks, the front shaft 93 being in the form of a large diameter tube having stub shafts welded in its ends. Two channel-shaped support arms 96 are welded to and project downwardly from the front shaft 93 whereas two flat, strap-like support arms 97 having a split hub 97a are secured to the shaft 94.

Although the sides of the carrier frame F of the subject application are cast as compared with the carrier frame in said pending application, the basic structure of this frame has been retained. Thus, the present carrier frame has forwardly and rearwardly extending, lower horizontal side portions 100a and 100b respectively adjacent to opposite sides of the main frame 25. The forwardly and rearwardly extending side portions are respectively pivotally connected to the lower ends of the front and rear arms 96 and 97 on their respective sides of the main frame by means of short shafts 101, each shaft having a large diameter portion providing a shoulder that abuts one face of the associated side portion and a threaded portion which receives a nut to lock the shaft on the side portion. The arms, the side braces 29, and the side portions 100a and 100b are in a parallelogram relationship (FIG. 2) so that during said oscillating movement of the carrier frame, the side portions are maintained horizontal.

The carrier frame F also has a pair of main upstanding side channels 105 integral with and upwardly extending from the lower side portions 100a and 100b; upper horizontal struts 106 forwardly projecting from the side channels 105; and front upstanding struts 107 rigidly interconnecting the upper struts and the lower side portions on opposite sides of the frame. It is to be observed that the swinging carrier frame formed by the side portions and channels and the struts is spaced inward of the intermediate side braces 29. An upper spacer channel 109 (FIG. 1) rigidly interconnects the upstanding side channels adjacent to their upper ends and extends transversely of the conveyor C. Rear horizontal aligner mounting portions 110 (FIG. 2) are integral with the upstanding side channels and project rearward therefrom in upwardly spaced relation to the lower rear side portions 100b.

Lower side panels 112 are integral with and project downward from the lower rear side portions 100b and the main side channels 105. The panels are in substantially common vertical planes with the side portions 100 and channels 105, the struts 106 and 107, and the conveyor chains 46 on their respective sides of the carrier frame F. A lower horizontal mounting channel 114 (FIGS. 3 and 4) extends transversely above the conveyor C and rigidly interconnects the panels.

With continued reference to the carrier frame F, a pair of transverse channels 115 and 116 (FIG. 3) rigidify the forward portion of the frame, and a horizontal upper guide channel 117 (FIG. 4) rigidly interconnects the upstanding side channels 105 and is in parallel relation to and below the upper spacer channel 109. An upper guide bar 118 (FIG. 4) is secured to the guide channel and extends the full width of the carrier frame. The guide bar provides a plurality of pairs of circular openings, not shown, spaced longitudinally therealong.

Upper mounting blocks 122 (FIG. 1) are secured to the inside surfaces of the upstanding side channels 105 adjacent to their upper ends. Elongated vertical guide rods 124 (FIG. 4) have upper ends (FIG. 1) bolted to the mounting blocks and lower ends secured to lower mounting blocks 122 on the side channels (FIG. 4). The guide rods are fixed in the carrier frame in a common vertical plane which is disposed substantially normal to and transversely of the conveyor C.

Front and rear, vertical hanger straps 112a (FIGS. 2-4) have upper ends bolted to each side panel 112 and lower ends spaced below the upper run 70 of the conveyor C. Horizontal tie straps 112b rigidly interconnect the lower ends of the hanger straps on opposite sides of the carrier frame F and shims 112c are positioned between the respective hanger and tie straps. Upper and lower pairs of spaced guides 112d are respectively secured to the side panels 112 and to the tie straps 112b and provide vertically aligned upper and lower slots 112e and 112f spaced outwardly from the conveyor chains 46.

Front and rear I-beams 125 extend transversely of and beneath the upper run 70 of the conveyor C and have opposite ends secured to the hanger straps 112a. Each I-beam has upper and lower horizontal flanges 125a and 125b interconnected by a vertical web 125c, it being noted that the spacing lengthwise of the upper run of the conveyor between the webs is the same as the spacing X between alternate flights 48 in the conveyor. During forward movement of the carrier frame F and the upper run of the conveyor, the I-beams are located directly beneath alternate flights of the conveyor. Each web has a plurality of vertical bores 125d opening through both the upper and lower flanges of their respective I-beam with the axes of these bores being spaced lengthwise of the I-beam by distances corresponding to the spacing of the actuating arms 59 on the movable jaw walls 56. Bosses 125e project rearward from each I-beam and circumscribe horizontal passages 125f communicating with the bores 125d, and plugs 125g are threaded in these passages. Each web has vertical passages 125' extending from said horizontal passages and opening through said lower plates.

Air cylinders 126 are fitted within the bores 125d in the I-beams 125 and project above the upper flanges 125a. O-rings 126a circumscribe the air cylinders within the bores and are in fluid-tight engagement with the webs 125c. A bottom plate 127 is positioned under the lower flange 125b of each I-beam with a gasket 125h interposed the bottom plate and the lower flange 125b. Collars 125i are positioned on the upper flanges 125a in circumscribing relation to the several cylinders 126, and bolts 125j extend downwardly through the collars, the upper flanges, the lower flanges, the gaskets, and the bottom plates. Nuts 125k are threaded on the lower ends of the bolts and tightened up against the bottom plates. In this manner, the air cylinders are retained in their respective bores. Each cylinder 126 has an air chamber 126b communicating through an upper port 126c in the cylinder with the corresponding horizontal and vertical passages 125f and 125'. A fluid-operated, jaw-closing ram 128 is provided for each air cylinder 126 and includes a piston 128a in its respective air chamber, a piston rod 128b projecting upward through the cylinder above the upper end thereof, and a jaw-closing cap 128c of resiliently flexible and deformable material such as rubber. The cap has a lower skirt portion 128d in spaced circumscribing relation to its respective cylinder and piston rod, an intermediate shoulder 128e, and an upper resilient finger 128f. The cap is held on its piston rod by a retainer indicated at 128g.

Each of the bottom plates 127 has front and rear, longitudinal manifolding grooves 127a and 127b, front vertical ducts 127c individually establishing communication between the front manifolding grooves and the several air chambers 126b, and rear vertical ducts 127d individually establishing communication between the rear manifolding grooves and the vertical passages 125', it being noted that openings are provided in the gaskets for effecting this communication. End fittings 125m are connected to the manifolding grooves at one end of each bottom plate, it being understood that the opposite ends of the manifolding grooves are closed.

Before describing how the air is delivered to and discharged from the air cylinders 126, it is to be noted that a plurality of front and rear deflectors 129 are respectively mounted on the front and rear I-beams 125. The deflectors on each beam are positioned so as to be directly below the lower bores 55f of the cups 55 which are aligned with the beams during the described forward movement of the upper run 70 and the carrier frame F. The front deflectors decline rearward whereas the rear deflectors decline forward and are provided for deflecting stem and core material which has been removed from the fruit downward from the I-beams.

Considering the actuation of the air cylinders 126, a ram control valve 130 is mounted on the intermediate side brace 30 by a bracket 130a. This valve has two positions, namely, a ram projecting position, and a ram retracting position. Hoses 130b are connected to this valve and have branches 130c and 130d connected to the front and rear end fittings 125m on the I-beams 125. A cam-operated valve 131 is mounted on one of the intermediate braces 29 and includes a plunger 131a movable between a ram extending position and a ram retracting position but being normally spring-urged into its retracted position. The cam-operated valve is connected to a source of air under pressure, not shown, and provides an exhaust port, also not shown, opening to the atmosphere. Conduits 132 interconnect the ram control valve 130 and the cam-operated valve 131 so that when the cam-operated valve is in its ram extending position, air is fed from the source to the ram control valve for placing the same in its ram extending position. Also, when the cam-operated valve is in its ram retracting position, air is delivered from the source to the ram control valve for placing the latter in its ram retracting position. In both instances, return air is exhausted to the atmosphere via the appropriate branch 130c or 130d, one of the conduits 132, and the exhaust port of the cam-operated valve 131. Thus, as the upper run 70 of the conveyor C and the carrier frame F move forwardly together, and just before the row of cups 55 over the rear I-beam 125 reach the stemming station 81 and the row of cups over the front I-beam reach the coring station 82, the valves 130 and 131 move to their ram extending positions. This forces the fingers 128f into engagement with their respective arms 59 thereby moving the jaw walls 56 into gripping engagement with the pears 80 in the several cups. Rails 112' (FIG. 4) project downward from the side channels 105 directly above the conveyor chains 46 so that, during air actuation of the rams 128, the chains contact the rails and limit upward movement of the flights 48. The jaw walls, in cooperation with the main side walls 55a, move the pears into generally axial alignment with their respective cup axes. The rams remain in their extended positions during the stemming and coring operations whereby the pears are held in correct orientation for accurate stemming and coring. When the stemming and coring operations are completed and before rearward movement of the carrier frame, the cam-operated valve 131 is shifted to its ram retracting position thereby shifting the ram control valve 130 to its ram retracting position. This forces air into the air chambers 126b through the upper ports 126c whereby the rams are retracted and the fingers are moved downwardly out of arm engagement. However, the jaw walls remain in fruit gripping engagement as the flights 48 move forwardly from the stemming and coring station; as will be recalled, the jaw walls remain in whatever positions they are placed and resist movement out of such positions because of the cup-shaped washers 58.

In order to insure retraction of the rams 128, the present invention provides a presser plate 133. This plate extends transversely of and beneath the upper run 70 of the conveyor C and includes a plurality of wings 133' (FIG. 4) projecting between the deflectors 129. The wings provide apertures 133a that receive the fingers 128f of the rams. A vertical rib 133b is secured to, extends lengthwise of, and projects downward from the plate between the front and rear rows of apertures, and a plurality of gussets 133c are connected between the rib and the plate for reinforcement. Vertical end slides 133d are secured to the rib and are slidably received in the upper and lower slots 112e and 112f on opposite sides of the conveyor run 70. The presser plate is thus mounted for vertical movement over the fingers between an upper position with the plates spaced above the shoulders 128e of the rams and a press-down position with the plate engaging the shoulders.

The presser plate 133 is actuated by a horizontal presser rockshaft 134 (FIG. 2) journalled in bearings 134a mounted on the front legs 26 of the main frame 25. Presser push-down levers 134b are secured to opposite ends of the rockshaft 134 and project rearward therefrom. Presser links 134c have upper ends pivotally connected to the push-down levers and lower ends pivotally connected to the end slides 133d on their respective sides of the carrier frame F. A presser camming lever 134d is rigidly connected to and forwardly extended from the presser rockshaft and mounts a cam follower 134e on its forwardmost end. In operation the presser rockshaft 134 is rocked substantially simultaneously with retraction of the rams 128 whereby the presser plate 133 is pushed down by the presser levers 134b and links 134c thereby positively retracting the rams in the event that they had not been retracted by air pressure. Immediately after the presser plate is pressed downward it is lifted upward by cam control through the rockshaft, levers, and links. Thus, the retraction of the rams by the presser plate is a safety feature that is relied upon primarily when there is failure in the air system. However, even if the fingers 128f are not retracted below the flights 48 as the flights move forwardly while the fingers are moving rearwardly, and the fingers engage the flights, the fingers simply flex forwardly and wipe past the flights so that no damage is done.

Main support bracket

The main support bracket B (FIGS. 1–4) is mounted for elevational movement on the guide rods 124 of the carrier frame F. This bracket includes a pair of upstanding angle members 136 individually disposed inwardly adjacent to the upstanding side channels 105. Upper and lower holders 137 (FIG. 2) are secured to each angle member 136 and mount vertically aligned bushings 138 therein, the bushings being slidably fitted on the adjacent guide rods 124. A horizontal, coring unit support channel 140 rigidly interconnects the angle members 136 between the upper and lower holders 137 and extends transversely above the conveyor, and two pairs of spaced ears 143 project rearward from this channel.

The main support bracket B (FIG. 3) also includes a pair of actuator support portions 146 each of which is made up of inclined, vertical and horizontal angle bars 146a, 146b and 146c rigidly secured together and projecting forward from one of the angle members 136 in a substantially common plane therewith. A horizontal actuator support bar 147 extends transversely between the vertical angle bars 146b.

In addition, the main support bracket B provides a horizontal upper mounting channel 150 positioned above the lower mounting channel 114 of the carrier frame F. The upper mounting channel is supported in this position by inner rigid support straps 151 (FIG. 1) and outer rigid support straps 152. The two outer straps 152 have lower ends secured to the upper mounting channel 150 and upper ends individually secured to the angle members 136 on their respective sides of the support bracket. The two inner straps have lower ends secured to the upper mounting channel 150 and upper ends secured to the angle members 136. Horizontal gussets 154 interconnect the lower ends of the angle members 136 and the upper mounting channel 150 for imparting rigidity to the structure. As seen in FIG. 2, above the upper mounting channel 150, the main support bracket B has a horizontal, stemming tube mounting bar 156 which is connected by arms 157 to the angle members 136 of the main bracket.

From the foregoing, it is evident that the main support bracket B is elevationally adjustable on the carrier frame F and is supported for forward and rearward oscillating movement with the carrier frame. Therefore, as the carrier frame swings back and forth with the arms 96 and 97, corresponding swinging movement is imparted to the channel 114 and the side panels 112 of frame F, and to the mounting channel 150, the stemming tube mounting bar 156, and the coring unit support channel 140 of bracket B. The swinging movement of the carrier frame and the main bracket is, of course, over the stemming and coring stations 81 and 82 and the upper run 79 of the fruit conveyor C. Attention is now directed to the apparatus provided by the subject invention for stemming the fruit 80.

Stemming units

The several stemming units SU (FIG. 4), for cutting out the stems 89 of the fruit 80, are mounted on the main support bracket B. The stemming units move up and down with the main bracket and back and forth with the carrier frame F. The number of stemming units corresponds to the number of lanes of fruit supporting cups 55; therefore, in the disclosed embodiment, there are eight stemming units. Inasmuch as all of the stemming units are of identical construction and are similarly mounted in the bracket B, only one such unit is specifically illustrated in FIG. 4 and described herein.

Thus, each stemming unit SU includes an upstanding guide sleeve 161 secured to the lower mounting channel 114 with its axis in a vertical plane passing through its corresponding lane of fruit supporting cups 55. A tubular shank 163 projects through the upper mounting channel 150 of the main support bracket B, is secured to a seater lifter plate 162 above the mounting channel 150, and is slidably extended downward through the guide sleeve 161. A cushion 167 is secured to the underside of the lifter plate 162 for cushioned engagement of the plate with the mounting channel. A fruit seating head 164 is threaded to the lower end of the shank 163 beneath the lower mounting channel 114, and a set screw 164a holds the head in desired position on the shank. Upper and lower bushings 165 are press-fit in the sleeve and are interposed between the sleeve and the shank, and a coiled compression spring 166 encircles the shank and bears against the seating head and the lower bushing.

Each stemming unit SU is also provided with a mounting head 168 secured to the mounting bar 156 of the main support bracket B. An elongated stemming tube 172, which has an upper end secured to the mounting head 168, is slidably fitted down within the shank 163, and has a lower fruit penetrating end 173 providing an annular knife edge. Upper and lower bushings 178 are press-fit in the shank 163 and are interposed between the shank and the stemming tube.

Still considering one of the stemming units SU, a stem ejection cylinder 180 is rigidly connected to the mounting head 168; is upwardly extended therefrom in coaxial relation with the stemming tube 172; and has an upper open end. A piston 182 is slidably fitted in air-tight relation within the cylinder for elevation reciprocating movement therein. O-rings 183 circumscribe the mounting head and the piston between the head and the piston and the cylinder. An ejector rod 184 of solid cross section has an upper end 185 secured to the piston, is axially slidably received within the stemming tube, and provides a lower end 186 near the lower end 173 of the stemming tube. A piston rod 187 is secured to the piston and extends upward from the upper end of the cylinder.

As in the invention described in the cited parent application, the stemming tube 172 and the ejector rod 184 are in minute, circumferentially spaced relation to each other so that an annular air passage 189 is provided therebetween whereby the stem ejection cylinder 180 (FIG. 4), the piston 182, and this air passage function to minimize damage to the stem end 86 of a pear 80, or other fruit, being stemmed in the subject apparatus.

An important feature of each stemming unit of the present invention is a latch mechanism LM that facilitates withdrawal of the stemming tube 172 from a pear 80 following stemming thereof. The latch mechanism of each stemming unit includes a seater latch rod 190 having a lower end rigidly connected to the respective guide sleeve 161 rearward of the shank 163 and an upper end slidably projecting through the upper mounting channel 150, the cushion 167 and the seater lifter plate 162. A latch mounting post 191 is secured to the lifter plate and projects upward therefrom in spaced parallel relation to the latch rod. The mounting post has an upper cap 191a, an intermediate diametrically reduced portion 191b, and a lower shoulder 191c. A latch release pin 192 is connected to the upper mounting channel by a nut 192' and projects upward through the cushion and seater plate in spaced parallel relation to the latch rod on the opposite side thereof from the mounting post. A retaining arch 193 is secured to the seater plate and arches over the latch relase pin in upwardly spaced relation thereto. A latch plate 194 has one end loosely rested on the release pin 192, an opposite end providing an aperture loosely receiving the reduced portion 191b of the mounting post, and an intermediate aperture loosely receiving the latch rod. As will be described more fully hereinafter, the latch mechanism allows downward movement of the shank 163 and the stemming tube 172, as in the cited copending application but precludes upward movement of the head 164 with the stemming tube until the stemming tube has been withdrawn from the pear. The arch confines the latch plate to a position above the pin and also precludes an undesirable latching effect as will be explained.

Inasmuch as the stemming tubes 172 and the stem ejection cylinders 180 of all of the stemming units SU are secured to the main support bracket B, the tubes and cylinders move elevationally with the main bracket. The ejector rods 184, however, are mounted for elevational movement independently of the main bracket and their associated stemming tubes and ejection cylinders. For this purpose, an ejector support bracket 195 (FIG. 2), extending the full width of the conveyor C, has spaced upper and lower end portions 196 mounted for elevational slidable movement on the guide rods 124 respectively above and below the upper holders 137 for the main support bracket. Upper and lower cross members 198 and vertical bars 198a rigidly interconnect the end portions 196 and rearwardly extended connecting blocks 197 on the upper cross member 198 are individually secured to the upper ends of the piston rods 187. Additionally, the ejector bracket has two pairs of lugs 199 (FIG. 1) which project rearwardly from the lower cross member adjacent to opposite sides of the ejector bracket for use in lowering and lifting the ejector bracket, in a manner to be described.

When each stemming unit SU is at the stemming station 81, it is vertically aligned with a fruit supporting cup in its associated lane of cups. To insure precise alignment of each stemming unit and a cup at the stemming station and to maintain this alignment throughout the stemming operation, pairs of elongated flight aligning rods 205 (FIGS. 2–4) are provided adjacent to opposite sides of the carrier frame F. The rods are slidably received in lateral angle members 110' on the aligner mounting portions 110; in the upper mounting channel 150; in the lower mounting channel 114; and in lower rod guides 206, the latter being individually secured to and projecting downward from the lower mounting channel 114 of frame F below the lower mounting channel 114. The rods have upper heads 208 above the extensions 110' of the aligner channels, lower ends 209 projecting below the rod guides 206 when the upper heads are in engagement with or closely adjacent to the aligner mounting channels 110, and collars 210 urged into engagement with the upper mounting channel 150 by springs 212 encircling the rods. The springs have upper and lower ends respectively bearing against the lateral members 110' and the collars of their respective rods. The lower ends 209 of the rods 205 move downwardly into the aligning holes 49 in each flight 48 of the conveyor C when the stemming units SU are aligned with a row of cups 55 in such flight and the main support bracket B moves down. It is to be noted, however, that the rods yield upwardly against the urging of the springs 212 if the lower ends of the rods are not aligned with the holes 49 and strike the flights.

*Coring units*

In addition to the stemming units SU, the several coring units CU (FIGS. 3 and 9) which embody important features of the present invention are supported on the main support bracket B and each coring unit is individually associated with one of the stemming units. The mounting of the coring units is described first. A plurality of coring unit holders 240 (FIG. 3), corresponding in number to the number of lanes of cups 55, are secured to a channel 240' which in turn is secured to the side panels 112 forwardly of the lower mounting channel 114. The holders are located above their respective lanes and forward of the stemming units. Each coring unit holder 240 includes a vertical plate 240a which has a pair of spaced upright guide sleeves 241 mounted on the upper corners of its forward face, only one sleeve 241 mounted on the upper corners of its forward face, only one sleeve 241 being shown in FIG. 3. A forwardly facing vertical rack 242 is bolted on each coring unit holder between the guide sleeves, a fastening lug 243 extends upward from the lower mounting channel back of each pair of guide sleeves and their associated racks, and a lower abutment 244 projects forward between the guide sleeve but below the rack.

Each pair of guide sleeves 241 of each coring unit holder 240 is in vertical, axial alignment with corresponding pairs of openings, not shown, in the upper guide bar 118. Coring unit slide rods 245 are individually slidably fitted in aligned openings of the guide bar 118 and the guide sleeves 241 for elevational slidable movement relative to the carrier frame F. A pair of these slide rods is provided for each lane of cups. A horizontal support plate 246 is secured to the upper ends of each pair of slide rods and, bonded to the undersurface of each plate 246, is a cushion, not shown, which rests on the coring unit support channel 140 of the main support bracket B. Therefore, the slide rods are moved up and down with the main support bracket when the support plate and cushion bear against the support channel 140.

One coring unit CU is secured to each pair of slide rods 245 for elevational movement therewith. Since all of the coring units are of identical construction, the significant details of only one such unit are described. Each coring unit (FIGS. 9–15) includes an inverted dampening cylinder 252 providing an upper wall 253, and a cylindrical side wall 254 circumscribing an open bottom 255 and having an upper lateral air escape port 256 opening forwardly out of the cylinder. Upper and lower pairs of mounting ears 257 are extended radially forward from the cylinder 252 and are secured to the associated pair of slide rods 245 between the upper guide bar 118 and the coring unit holder 240. It is to be noted that the lower mounting ears are not shown in the drawings. Coring unit compression springs 258 encircle the slide rods 245 and have opposite ends bearing against the upper guide bar 118 and the ears 257 on the dampening cylinder 252. The purpose of these springs is to cushion upward movement of the coring unit and to overcome lag during initiation of its downward movement.

A dampening piston 260 includes a lower shank 261 connected to the fastening lug 243 of the adjacent coring unit holder 240 by a pin 262. A centering rod 264 is secured to the dampening piston and is coaxially upwardly extended therefrom. The centering rod is also coaxially extended through the dampening cylinder 252 and slidably received in an opening in the upper wall 253 thereof. A cushion 266 is secured to the upper surface of the dampening piston in circumscribing relation to the centering rod.

Each coring unit CU also includes a generally cylindrical housing 270, constituting a mounting or supporting member. The housing has an upper, diametrically enlarged portion 271 and a cap 272 secured to the upper portion. The cap is releasably secured to the upper mounting ears 257 of the associated dampening cylinder 252, and the upper portion 271 of the housing is releasably connected to the lower mounting ears, not shown, of each dampening cylinder. Since the ears 257 are secured to the slide rods 245, the dampening cylinder and the housing are mounted for elevational movement with the slide rods 245. In addition, the upper portion 271 of the housing 270 has a forward protuberance 278, an internal longitudinal air escape passage 280 having an upper end 281 communicating with the port 256 and a lower end providing a downwardly opening socket 282. Further, the housing of each coring unit CU also has a lower, diametrically reduced portion 285 terminating in a lower tubular end 286.

Each coring unit CU has a coring shaft 296 coaxially received within the housing 270 and rotatably journalled in the upper portion 271 thereof for rotation within the housing. However, the shaft is held against axial movement relative to the housing. The coring shaft has an upper section, not shown, within the upper portion 271 of the housing and a lower tubular section 299 downwardly projecting from the upper section through the lower portion 285 of the housing, and a bushing 300 is positioned between the housing and the coring shaft.

The lower tubular section 299 of each coring shaft 296 includes a lower end 316 below the lower end 286 of the housing 270, a lower bore 317 diametrically larger than and communicating with an upper bore 307 in the shaft. The lower bore has a pair of diametrically opposed slots 317a which extend to the lower end of the coring shaft.

Still further, each coring unit CU includes an elongated coring knife 325 positioned within the lower bore 317 of the coring shaft 296 in the plane of the slots 317a and is pivotally connected to the shaft. For this purpose, a knife-mounting pin 326 is extended transversely through the lower end 316 of the coring shaft and below the lower end 286 of the housing 270. A retaining ring 327 is fitted in an annular groove in the shaft underneath the pin for releasably retaining the latter in the shaft. The coring knife has an intermediate shank 328 positioned within the lower bore 317 and through which the mounting pin is passed. The knife also has an arm 329 projecting obliquely upwardly from the shank, said arm providing an endwardly opening camway 330 therein. A generally semi-elliptical blade 332 which terminates in a fruit penetrating end 334 is formed on the lower end of the knife. Although the knife pivots with respect to the coring shaft, it rotates with the shaft.

As in the cited copending application, pivoting movement of each coring knife 325 is automatically controlled in accordance with the size of the fruit 80 being cored. In order to control pivoting movement of the coring knife 325, each coring unit CU is provided with a knife actuating plunger 340 mounted within the coring shaft 296 for elevational reciprocating movement therein. The plunger includes a lower cylindrical block 341 which is slidably received within the lower bore 317 and has a transverse recess 342 receiving the arm 329 of the coring knife therewithin. A camming pin 344 is mounted in and extended transversely of the block and is slidably received in the camway 330. The plunger also includes a cylindrical stem 346 axially upwardly projecting from the block and slidably received in the upper bore 307.

The structure by which the plunger 340 of each coring unit CU is moved up and down, that is, reciprocated axially, relatively to its coring shaft 296 is fully disclosed in the cited copending application, but as illustrated herein, a pivot pin 370 is extended through the protuberance 278 of each housing 270 and is connected, in a manner not shown herein, to the plunger so that rotation of the pin causes the plunger to move up and down.

For rotating the pivot pin 370, a knife actuating lever 378 is secured to an end of each pivot pin 370. The lever 378 (FIG. 3) is extended radially forward and upward from its housing 270 and is pivotally connected to the actuator support bar 147 of the main support bracket B by a telescopically adjustable link 380. Whenever the main support bracket B moves vertically relatively to one of the housings, therefore, the lever 378 for such housing rotates its pivot pin. It is important to note that such movement of the support bracket B relative to a housing 270 causes the latter's plunger 340 to move axially in its coring shaft 296 and its coring knife 325 to pivot between a retracted position in substantially coaxial alignment with the coring shaft and a coring position in acute angular relation to the axis of the coring shaft. Conversely, it is important to note that as long as there is no relative elevational movement between the main support bracket and the housing, there is no pivotal movement of the coring knife. These features are used to advantage in controlling the pivoting of the knife in accordance with the fruit size, as will be seen.

In addition to a coring knife 325, each coring unit CU also provides a pair of calyx knives 388 (FIGS. 9 and 15). For mounting the calyx knives, each coring unit has a calyx knife holder 390 including an upper cylindrical portion 391 slidably received within the lower portion of the bore 317 of the coring shaft 296. The upper portion of the knife holder 390 has a transverse recess 393 receiving the shank 328 of the coring knife for movement therein. The upper portion of the knife holder also has a pair of elongated, longitudinally extended slots 395 disposed transversely of and on opposite sides of the recess 393 and receiving the mounting pin 326 therein. The calyx knife holder is thus mounted for limited axial movement relative to the coring shaft, which movement is limited by the engagement of the mounting pin 326 with the knife holder at opposite ends of the slot 395.

Each calyx knife holder 390 also includes a lower tubular portion 397 in circumferentially spaced relation to the shank 328 of the coring knife 325 and an annular flange 398 projecting radially outward from said lower portion. The calyx knives 388 in each holder are mounted within the lower portion 397 of the holder on opposite sides of the coring knife and in a common plane with each other. The calyx knives, therefore, can move axially of the coring shaft 296 and the coring knife but rotate with the latter.

Each coring unit CU also includes a depth control mechanism 400 for controlling the extent of entry of the coring knife 325 into the fruit 80. This mechanism provides a cylindrical, depth gauging or control sleeve 405 which is slidably fitted on the lower portion 285 of the housing 270 for axial movement thereon. The sleeve has an upper end portion 406 and a lower end portion connected in circumscribing relation to a cylindrical downward extension 406a of the upper end portion. An upper guide ear 406b and an upper block 407 project radially outward from the sleeve's upper end portion 406. This block has an air passage 407a therein that has one end in communication with a tubular sleeve guide 408 projecting upward from the block and an opposite end opening into a vertical bore 407b in the block. The sleeve guide is slidably fitted in the socket 282 and is in communication with the passage 280. The lower portion of the sleeve has annular radially inwardly extended end ledge 410, an access opening 412 which is plugged when not in use, and a lower liquid inlet port 414. A flushing conduit 416 (FIG. 3) is connected to each inlet port and has an opposite end connected to a water manifold 417 mounted on downward extensions of the lower side portions 100a of the carrier frame F. It is to be noted that flushing water entering the port 414 passes through the recess 393 and then through the tubular portion 397 of the calyx knife holder 390 to the coring area.

Each depth gauging sleeve 405 (FIG. 9) is connected to its calyx knife holder 390 by an upper washer 420 seated against said downward extension 406a and in engagement with the upper surface of the flange 398, a lower washer 421 positioned against the lower surface of the flange and against the end ledge 410, and in intermediate spacing washer 422 positioned between the upper and lower washers and between the sleeve and the flange 398.

Each depth control mechanism 400 also includes an annular depth gauging or control ring 425 mounted on the sleeve 405 for movement axially thereof. The depth gauging ring provides a lower, downwardly divergently projecting, frusto-conical fruit engaging surface 427 terminating in a lower edge 428. The ring also has an upper edge annular edge 429 and an annular seal 430 bonded on the upper edge 429; in turn, the seal presents an upper annular edge 431. The seal is of resilienlty flexible and deformable material such as rubber.

To mount the ring 425 on the sleeve 405, upper and lower pairs of mounting lugs 436 (FIGS. 11 and 14) are radially outwardly extended from the sleeve with corresponding lugs being in vertical alignment with each other and with the bore 407b in the block 407 and the ear 406b. Ring rods 438 are individually slidably fitted in vertically aligned mounting lugs and extend above the upper lugs for slidable reception respectively in the bore 407b and through the ear 406b. When the rod is in the bore 407b and over the passage 407a, flow of air from the cylinder 252 through the port 256 and the passage 280 is precluded. J-shaped mounting bars 440 have lower ends connected to the gauging ring 425 in spaced relation circumferentially of the ring. The bars extend upward alongside of the sleeve 405 and between the upper and lower pairs of mounting lugs. Upper and lower plates 441 and 442 are rigidly secured to the mounting bars and to the ring rods 438. It is to be noted that the upper plate 441 is located above the upper pair of mounting lugs 436 and that the lower plate is located above the lower pair of mounting lugs 436. In this manner, the gauging ring is mounted in concentric circumscribing relation to the calyx knife holder 390; furthermore, the ring and the sleeve are movable relatively to each other between a spaced apart position with the upper edge 431 of the ring spaced below the lower washer 421 and a depth limiting position with said upper edge in contact with said lower washer. The ring is yieldably urged into its spaced apart position by compression springs 443 which encircle the rods 438 and have upper ends bearing against the upper mounting lugs 436 and lower ends bearing against the lower plate 442.

In order to limit downward movement of each coring unit CU when coring a pear 80 in a cup 55 and thereby to relieve the weight of the coring unit from the pear 80 being cored, flanges 445 project rearward from the upper ends of the mounting bars 440 in spaced relation to each other. A bolt 446 passes through these flanges, and a nut 447 is threaded on the bolt. A weight-relieving pawl 448 is pivoted on the bolt between the flange and includes a lower locking detent 449 and an upper actuating portion 450. The locking detent is located in a longitudinal vertical plane passing through the rack 242 for its respective coring unit, said rack being rigidly mounted on the carrier frame F, as previously explained. The actuating portion is located beneath the block 407 on the depth control sleeve 405 so that upon downward movement of the sleeve relative to the ring 425, the block eventually contacts the actuating portion and moves the locking dent outwardly for engagement with the rack. When the pawl engages the rack, the rack and pawl support the coring unit on the carrier frame. A compression spring 452 between the actuating portion and the upper plate 441 yieldably urges the pawl into a retracted position wherein it does not engage the rack. Thus, when the block moves upward away from the actuating portion, the locking detent snaps inward against the upper plate into its retracted position.

In order to limit downward movement of each coring unit CU when there is no pear 80 in a cup 55 therebelow and thereby to prevent the ring 425 from striking the cup, a limit block 455 is secured to and extends between the mounting bars 440 below the pawl 443. The abutment 244 on the carrier frame F is in the path of movement of the limit block and thus limits downward travel of the coring unit when engaged by the limit block.

Because the seed cell cavity in small fruit 80 is closer to the butt end 85 of the pear than is the seed cell cavity of large fruit, an important feature of the present invention, as in the cited application, is a mechanism operable to prevent projection of the coring knife 325 as far below the gauge ring 425 when a smaller pear is in a cup 55 as when a large pear is in that cup.

Accordingly, the same control linkage as used in the apparatus disclosed in the cited application is connected to the sleeve 405, of each coring unit CU so that the axial spacing between the fruit penetrating end 334 of each coring knife 325 and the fruit engaging edge 428 of its depth gauging ring 425 is automatically controlled in accordance with the size of the fruit 80 being cored. Specifically, cam followers 475 (FIGS. 3 and 11) are diametrically outwardly extended from the upper end portion 406 of each sleeve 405. Coaxial pivot pins 477 are secured in the sleeve 405 and are diametrically outwardly extended from the housing in a common vertical plane with the cam followers.

Depth control cam plates 478 are individually mounted on the pivot pins 477 for pivotal movement about an axis which extends transversely of the housing 270. Each plate has a camming slot 479 (FIG. 3) receiving a cam follower 475 and including a first section 480 and a second section 481 having the same construction as in the cited application.

With the cam followers 475 in the first sections 480 of the slots 479 during pivotal movement of the plates 478 there is no movement of the sleeve 405 axially on, that is, with respect to, the housing 270. With the cam followers in the second sections 481 of the slots, pivotal movement of the cam plates causes the sleeve to move axially on the housing between an uppermost position when the cam followers are relatively adjacent to the first sections of the slots, and a lowermost position when the cam followers abut outer ends 486 of the slots.

For controlling pivoting of the cam plates 478, each coring unit CU has a depth control yoke 490, which includes a pair of arms 491 individually secured to the cam plates, a central portion 492 interconecting the arms, and an elongated lever 493 rigidly connected to the central portion and projecting forward from the housing 270. The cam plates are pivoted in response to elevational movement of their lever.

In order to pivot the levers 493 associated with all of the coring units CU in the subject apparatus, a control shaft 497 (FIG. 3) has opposite ends journalled in the downward extensions of the lower side portions 100a and is extended transversely of the conveyor C and of the carrier frame F. Links 498 are secured to the shaft 497 in longitudinally spaced relation therealong and are individually pivotally connected by pins 499 to their respective levers 493.

As each coring unit CU travels downwardly, its cam plates 478 are pivoted by its lever 493 so that during an upper part of such travel, the cam followers 475 are in the first sections 480 of the slots 479; thus, the lower washer 421 on the sleeve 405 and the upper edge 431 on the ring 425 are in maximum spaced relation, to each other. If the coring unit moves down far enough, the cam followers move into the slots' second sections 481, and the lower washer moves progressively closer to the upper edge 431. During an actual coring operation, the ring 425 first engages the blossom end 85 of the pear 80 and thereafter, the sleeve 405 including the lower washer moves downward toward the ring. Irrespective of whether the cam followers remain in the first sections or enter the second sections of the slots, the sleeve continues to move downward relative to the ring until the lower washer engages the upper edge 431. However, the farther the cam followers move into the second slots, the sooner the lower washer will contact said upper edge since, as both the housing 271 and the sleeve 405 move toward the ring, the sleeve is at the same time sliding downward on the housing toward the ring. Thus, if a small pear is in the cup 55, the coring unit will move down far enough to position the cam followers in the second sections of the slots and cause the lower washer to engage the upper edge sooner than if a large pear is in the cup. Thus, with a small pear, the distance between the penetrating end 334 of the coring knife 325 and the lower edge 428 of the ring will be a minimum so that the coring knife will not project as far out of the ring as when a large pear is in the cup.

It is evident, therefore, that as the pears 80 (FIG. 3) are moved in the direction of arrow 73 by the conveyor C, they are successively stemmed and cored by the stemming and coring units SU and CU, respectively. The portions of the pears which are cut out by these units and the flushing water which is sprayed from the coring unit are collected in a drain pan 505 (FIG. 2) mounted in the main frame 25 between the upper and lower runs 70 and 71 and below the stemming and coring stations 81 and 82.

*Fruit lifter and fruit splitters*

After the pears 80 are cored, they continue their travel in the conveyor C toward the forward drive shaft 41 into a fruit splitting station 506 where they encounter fruit splitters FS and the fruit lifter L. Each fruit splitter provides a vertical channel 507 (FIG. 3) secured to the vertical angle bar 146b for its respective lane of cups 55. A horizontal pin 507a is secured in the channel in upwardly spaced relation to a block 507b also secured in the channel. A blade rod 508 is positioned within the channel 507 and provides an upper notch 508a fitted over the pin thereby limiting upward movement of the rod and an intermediate portion slidably passing through the block. A spring latch 507c has an upper portion secured to the channel 507 and a resiliently flexible lower tab 507d which provides an opening loosely receiving the rod. With the tab yieldably bearing downwardly against the rod, it binds against the rod and prevents movement of the rod downward in the channel; when the tab is lifted it releases its bind on the rod and allows the same to slip out of the channel. A fruit splitting blade 509 is secured to each rod in upwardly spaced relation to a lower guiding portion 508b. The fruit splitters are, therefore, mounted on the main support bracket B for elevation movement therewith and are readily removable and replaceable. The movement of the conveyor C and the main support bracket and the position of the knife rods are such that as the carrier frame F and the upper run 70 move forward together, each blade rod is in alignment with the lower bore 55f of a cup 55 in its respective lane of cups. Furthermore, the splitting blades are moved downward by the main support bracket and forced through pears 80 which have been stemmed and cored.

The purpose of the fruit lifter L is to guide the splitting blades 509, to aid in splitting, and to unseat or lift the pears from the fruit supporting cups 55. The fruit lifter comprises pivot brackets 510 (FIG. 2) which are individually secured to the lower mounting panels 112.

These brackets project downward from the mounting panels and are outwardly spaced from the side braces 30. The fruit lifter L also includes arms 512 having rear ends individually pivotally connected at 513 to the pivot brackets and front ends interconnected by a central angle iron 515 extending underneath the upper run 70 of the conveyor at the splitting station 506. A holding bar 516 is mounted on the central angle iron, and a plurality of tubular fruit lifting fingers 518 having open upper ends 518a project upward from the holding bar in alignment with the lanes of cups 55; that is, the number of fingers is the same as the number of lanes.

The fruit lifter L is vertically oscillated by a lifter rockshaft 525 (FIG. 2) journalled in the main frame 25 in bearings 526 secured to the front legs 26 immediately below the side braces 29. Fruit lifting levers 528 are secured to the rockshaft 525 and are individually pivotally connected to the lifter arms 512 by generally upstanding links 530. A camming lever 532 mounting a cam follower 533 (FIG. 1) is also secured to the rockshaft 525 and projects forward therefrom. During forward movement of the carrier frame F, the fruit lifter is raised by the links 530 and levers 528 to bring the tubular fingers 518 immediately under the lower bores 55f in the cups 55 at the splitting station 506. In these positions, the lifting fingers are in alignment with the bores of the stemmed and cored pears and the guiding portions 508b of the blade rods 508 of the fruit splitters FS. As the blade rods are lowered by the main support bracket, these lower guiding portions pass through the bores of the pears and enter the fruit lifting fingers thereby to guide the fruit splitting operation. The splitting blades cut diametrically through the fruit but before the blades touch the cups, the lifting fingers are moved upwardly by links 530 and levers 528 and raise the fruit out of the cups and upwardly relative to the blades thereby to complete the cutting action and to unseat the fruit from the cups. Since the blades do not contact the cups, the repeated splitting action does not damage the cups.

Cooperating with the fruit lifter L and the fruit splitters FS at the splitting station 506 is a cup opener CO. It will be recalled that the jaw walls 56 of the cups 55 remain in fruit gripping positions after the cups leave the coring station 82 because of the washers 58. The purpose of the cup opener is to move the jaw walls into retracted positions after the blade rods enter the fingers 518 and just prior to engagement of the splitting blades with the fruit. Thus, the cup opener includes a pair of arms 534 pivotally mounted at 534a on the same horizontal pivot axis as the fruit lifter L and forwardly extending beneath the level of the upper run 70 and inwardly of the arms 512 of the fruit lifter. An angle iron 534b rigidly interconnects the arms 534 and provides a plurality of openings slidably receiving the fruit lifting fingers 518. A plurality of leaf springs 535 are bolted to the angle iron 534b and project forward in upwardly spaced relation to the angle iron. These leaf springs have openings which receive the fruit lifting fingers and allow the springs to be moved downwardly, relative to the fruit lifting fingers, toward the angle iron. Further, the leaf springs are in alignment with the several lanes of cups 55 and, specifically, are positioned for engagement with the inner segments 56f of the cups 55 which are at the splitting station 506 during concurrent forward movement of the carrier frame F and the upper run 70 of the conveyor. An opener rockshaft 536 is journalled in bearings 536a on the legs 26. Opener levers 537 project rearward from the opener rockshaft and are pivotally connected to the arms 534 on respective sides of the carrier frame F by links 538. Further, a camming lever 539 projects forward from the opener rockshaft and mounts a cam follower 539a (FIG. 1).

*Cam control and operation*

In order to control the conveyor C (FIG. 1), the carrier frame F, the main support bracket B and thus the fruit splitters FS, the stemming units SU, the coring units CU, the ram control valve 130, the presser plate 132, the fruit lifter L (FIG. 2) and the cup opener CO in properly timed relation, a camshaft 540 (FIGS. 1 and 2) is journalled in the main frame 25 in a substantially horizontal position adjacent to the front legs 26 and above the side braces 29. The camshaft has a driven end 541 (FIG. 1) which is coupled to the main drive motor 542 by a speed-change mechanism 543 and a pulley-belt drive 544. The camshaft also has a driving end 546 to which is secured a driving bevel gear 547.

For driving the conveyor C, an inclined, intermediate shaft 550 (FIG. 2) is journalled in bearings 551 secured to the main frame 25 on the same side thereof as the driving bevel gear 547. An upper driven bevel gear 553 is secured to the upper end of the intermediate shaft and is in mesh with the driving bevel gear. A lower drive bevel gear 555 is secured to the lower end of the intermediate shaft and is in mesh with the driven bevel gear 44 associated with the fruit conveyor. Accordingly, when the camshaft is rotated by the drive motor 542, movement in direction 73 is imparted to the conveyor. In an actual embodiment of the invention, each flight 48 (FIG. 1) moves a distance of four inches, that is, the distance between adjacent cups 55 in each lane, for each revolution of the camshaft, it being understood that the invention is not limited to this precise relationship.

To oscillate the carrier frame F, carrier frame cams 560 (FIG. 1) providing annular cam tracks are secured to the camshaft 540 in spaced relation therealong. Carrier control levers 562 are secured to the front rockshaft 93 and mount cam followers 566 located in the cam tracks of the carrier frame cams. As the camshaft rotates, the rockshaft 93 is oscillated in opposite directions by the carrier cams thereby to swing the carrier frame F forwardly and rearwardly. For a more specific description of the oscillating cycle of the carrier frame, reference is made to the cited pending application. Briefly, however, as the carrier frame advances from its rearwardmost position, the stemming and coring units SU and CU are in vertical alignment with a pair of rows of fruit supporting cups 55. The carrier frame swings forwardly at a constant velocity equal to the velocity of forward travel of the upper run 70 of the fruit conveyor C. At the end of its forward stroke, the carrier frame swings rearwardly, and then the carrier frame starts its forward movement again. As the carrier frame swings rearwardly and starts its forward travel, the upper run of the conveyor continues to move forwardly so that the stemming and coring units are repeatedly indexed over successive pairs of spaced rows (indicated by X in FIG. 3) of cups holding pears 80 to be stemmed and cored.

A cup closing cam 567 is secured to the camshaft 540 adjacent to the cam operated valve 131. A lever 568 is pivoted on the main frame 25 at 568' and mounts a cam follower 569 riding on the cam 567 so that during each rotation of the camshaft, the lever is pivoted into contact with the plunger 131a, forcing it into ram extending position, and is then pivoted out of contact with the plunger 131a, allowing it to be spring-urged into ram retracting position. The lever contacts the plunger as the carrier frame F moves forwardly and just before the stemming and coring units SU and CU reach the stemming and coring stations 81 and 82. The lever moves out of contact with the plunger after stemming and coring is completed and before the carrier frame moves rearwardly. A presser cam 134f is also secured to the camshaft and has a track receiving the follower 134e. The presser cam rocks the rockshaft once during each rotation of the camshaft so as to push the plate 133 down immediately after completion of stemming and coring and before rearward movement of the carrier frame and so as to lift the plate during rearward travel of the carrier frame.

In order to control the elevational movement of the stemming units SU and fruit splitters FS (both through the main support bracket B), stemming tube cams 570

(FIG. 1) are mounted on the camshaft 540 on opposite sides of the carrier frame cams 560 and each has an annular cam track. A stemming tube rock-shaft 573 (FIGS. 1 and 2) is journalled in the main frame 25 in rearwardly upwardly spaced, substantially parallel relation to the camshaft. Stemming tube lifting levers 575 are secured to the stemming tube rockshaft and include cam end portions 576 projecting forward over the camshaft and rearwardly projecting unit end portions 577. Cam followers 578 are individually mounted on the cam end portions and are individually received in the cam tracks of the stemming tube cams. Adjustable hanging links 579 (FIG. 1), which have adjustable eye members threaded on each end, are pivotally connected at their upper ends to the unit end portions of the lifting levers and individually pivotally connected at their lower ends between the pairs of spaced ears 143 on the coring unit support channel 140 of the main support bracket B. Therefore, as the rockshaft 573 (FIG. 2) is oscillated in response to rotation of the camshaft 540, the main support bracket B is moved up and down on the guide rods 124 (FIG. 3). The direct effect of lowering the main support bracket is to lower each seating head 164 against a pear in a cup 55 and then to thrust the stemming tube 172 downwardly through the pear and to thrust each splitting blade 509 into a pear therebelow; lifting the bracket B withdraws the tubes and, when the latch mechanism LM is released, lifts the seating heads; lifting the bracket also lifts the splitting blades. Indirectly, however, this elevational movement of the main support bracket also controls the movement of the coring unit CU since the latter is supported on the channel 140. The cam-controlled travel of the stemming tube will be specifically discusssed but prior thereto, attention is briefly directed to the control of the stem ejector rod 184 (FIG. 4).

A stem ejector cam 585 (FIG. 1) is secured to the camshaft 540 between the stemming tube cams 570 and the carrier frame cams 560, it being noted that the ejector cam also has an annular cam track. A horizontal ejector rockshaft 588 is journalled in the main frame 25 in forwardly and upwardly spaced parallel relation to the stemming tube rockshaft 573. Outer unit support arms 589 have front ends rigidly connected to the rockshaft 588 and rear ends individually pivotally connected to the pairs of lugs 199 (FIGS. 1 and 3) on the ejector bracket 195 by support links 590. A cross brace 592 (FIG. 1) rigidly interconnects the pivot support arms for imparting rigidity thereto. A stem ejector lifting lever 593 is secured to the stem ejector rockshaft between the unit support arms and includes a forward portion 594 mounting a cam follower 595 received in the ejector cam track and a rear portion 597 secured to the cross brace 592. As is believed understood, oscillation of the rockshaft 588 upon rotation of the camshaft causes elevational movement of the ejector bracket 195, and thus the stem ejector rod 184 (FIG. 4) relative to the stemming tube 172, all as specifically described in the cited application.

Assuming the stemming unit SU is in vertical alignment with a cup 55 supporting a pear 80 to be stemmed, the stemming tube cams 570 (FIG. 1) cause the stemming tube 172 (FIG. 4) and thus the seating head 164 to move downwardly toward the pear, it being noted that when the carrier frame F is at its rearwardmost position, the stemming tube has already begun its downward movement. The seating head first engages the pear, which is firmly held by the jaw walls 56 in axial alignment with the stemming tube 172, and seats the pear in the bowl portion 55c of the cup 55 between the jaw and side walls 56 and 55a thereof. It will be noted that the gripping surfaces 56b of the jaw walls permit the pear to be slid downward in the cup without damaging the pear. Also, even though the seating head can move up relative to the channel 150, the weight of the seating head, shank 163, and lifter plate 162 is enough to seat the pear. Although further downward movement of the head 164, the shank 163 and the lifter plate 162 is arrested when the head 164 engages the pear, the stemming tube and upper mounting channel 150 continue downward. As the carrier frame moves forwardly, the stemming tube moves through the lower bore 55f in the cup 55 and, therefore, cuts completely through the pear around the stem 89 thereof and emerges through the stem end 86. The stemming tube continues to travel even farther downwardly and, after reaching its lowermost point, moves upwardly, it being noted that as the stemming tube is being withdrawn from the pear, the latch mechanism LM holds the pear in the cup to prevent its being lifted by the tube.

The specific operation of the latch mechanism LM is as follows. As previously explained, the latch mechanism does not affect the downward movement of the seating head 164 and the stemming tube 172 and is only actuated on the upstroke. Before the upper mounting channel 150 of the main support bracket B moves downwardly, however, it is to be noted (FIG. 4) that the left end of the latch plate rests on the latch release pin 192 and that the right end of this plate rests on the shoulder 191c of the mounting post 191. After downward movement of the seating head is arrested, as above described, continued downward movement of the mounting channel moves the latch release pin downward away from the left end of the latch plate. After the stemming operation is completed and as the stemming tube is pulled upwardly by upward movement of the main support bracket, adherence of the pear to the stemming tube places an upward force on the seating head, the shank 163 and the lifter plate 162. This upward force is transmitted through the mounting post to the right end of the latch plate whereby the latch plate binds against the latch rod 199. Thus, this upward force of the pear on the seating head is ineffective to move the seating head upward with the stemming tube. Accordingly, the pear remains seated in its cup, and the stemming tube is easily withdrawn from the pear. Just as the stemming tube is withdrawn from the pear, the upper mounting channel moves into engagement with the cushion 167 thereby lifting the cushion and the lifter plate 162 upward with the mounting channel. The latch release pin 192 moves upward with the mounting channel into engagement with the left end of the latch plate lifting the latch plate into a substantially horizontal position, that is into a position wherein the binding action of the latch plate on the latch rod is relieved. Therefore, after the stemming tube has been fully withdrawn from the pear, the mounting channel lifts the seating head along with the stemming tube upwardly to their uppermost positions in preparation for a further downstroke.

The retaining arch 193 not only keeps the latch plate over the pin 192, but it also prevents binding of the plate against the rod as a result of upward force on the left end of the latch plate. This could occur if the cushion 167 wore or fell out allowing greater upward movement of the channel 150 relative to the lifter plate. The presence of the arch limits upward movement of the left end of the latch plate to a non-binding position.

The ejector rod 184 (FIG. 4) is moved downwardly by the ejector cam 585 (FIG. 1) at approximately the same rate as the stemming tube 172 (FIG. 4) until just after the stemming tube penetrates the pear 80. Then, the ejector cam moves the ejector rod upwardly relative to the downwardly moving stemming tube. The rather abrupt upward movement of the piston 182 (FIG. 4), which is attached to the ejector bracket 195, with respect to the downward movement of the cylinder 180, which is attached to the stemming tube, creates a partial vacuum in the cylinder below the piston and in the annular air passage 189 between the stemming tube and the ejector rod. This partial vacuum is created during the time the stemming tube is moving through the stem end 86 of the pear. By reducing the pressure below atmospheric pressure internally on the central core of fruit including the stem 89, as the stemming tube cuts through the pear and separates this core from the fruit, the stem end of the pear is held upwardly against and integral with the pear. Therefore, the stemming tube cuts a clean cylindrical core of fruit out of the pear and does not break off the stem end of the fruit.

After the stemming tube 172 is all the way through the pear 80, the stem ejector cam 585 (FIG. 1) moves the ejector rod 184 (FIG. 4) downwardly relatively to the stemming tube. Thus, the cylindrical core of fruit, including the stem 89, within the stemming tube is forced out of the stemming tube by the ejector rod, whereupon the core falls into the drain pan 505 (FIG. 2). Thereafter, the stem ejector rod is moved upwardly and also experiences a dwell period along with the stemming tube before it starts its downward travel again.

As indicated above, elevational movement of the coring units 238 (FIG. 1) is controlled by the stemming tube cams 570. However, for rotating the coring knives 325 (FIG. 3) a coring knife motor 600 is mounted on the platform 34. The coring knife motor is coupled to the upper driven ends, not shown, of the coring shafts 296 by separate flexible shafts 601 (FIGS. 1 and 2).

In describing the operation of one of the coring units CU (FIG. 9), it is assumed that the coring unit is in vertical alignment with a pear 80 to be cored in a cup 55 and that the coring shaft 296 and coring knife 325 are rotating. As the main support bracket B moves downwardly (FIG. 3), it lowers the coring unit since the weight of the latter is borne by the channel 140 of said bracket. The gauging ring 425 is the first part of the coring unit to engage the pear, and it does so at the blossom end 85, it being remembered that the pear is held by the jaw walls 56 of the cup 55 in axial alignment with the coring shaft 296. However, pressure of the springs 443 acting through the ring 425, helps to keep the pear seated during coring.

Initial engagement of the coring unit CU with the pear 80 is cushioned by the springs 453 and also by the dampening cylinder 252. The latter operates in this manner: During initial downward movement of the coring unit, the dampening piston 260 is outside (FIG. 3) of the dampening cylinder so that no dampening of downward movement is imposed. About three quarters of an inch before the gauging ring 425 contacts the pear, the piston 260 enters the cylinder 252 (FIG. 9) and attempts to force a relatively large volume of air through the port 256, the passage 280, the guide 408, and the passage 407a to the atmosphere. Since movement of the air out of the cylinder 252 by the piston 260 is restricted, downward movement of the coring unit is resisted so as to prevent crushing of the pear by sudden impact of the weight of the coring unit. After the gauging ring 425 contacts the pear, further downward movement of the ring rods 438 is arrested. However, since the sleeve 405 continues to move down, the block 407 moves over the associated rod 438 whereupon the rod blocks the passage 407a and escape of air therethrough ceases. Air is now forced out of the dampening cylinder at a controlled rate through an adjustable check valve 605 mounted in the upper wall 253. Whereas initial entry of the dampening piston 260 into the dampening cylinder 252 slowed down movement of the coring unit, release of air through the check valve dampens the movement even more. It should be noted at this point that the check valve allows air to enter the cylinder without appreciable restriction so that, on the upstroke, the dampening cylinder can be lifted off the piston.

As previously mentioned, after the gauging ring 425 contacts the pear 80, the housing 270 and the depth gauging sleeve 405 continue to move downward because of the continued downward travel of the main support bracket 135, thereby inserting the knife 325 into the bore of the pear, said bore having been provided by the stemming tube 172 (FIG. 4) at the stemming station 81. During the downward travel of the coring unit as described so far, the knife is in its retracted position since there has been no relative movement between the main bracket and the coring unit, and therefore, there has been no pivotal movement of the knife actuating lever 378 relative to the housing.

As emphasized before, the location of the knife 325 axially within the pear 80 and the extent of outward pivoting of the knife within the pear depend on the size of the pear and are two of the most important functions performed by the subject apparatus. It will be evident that the blossom end 85 of a pear that is relatively long or that has a large diameter projects farther upward from its cup 55 than the blossom end of a pear that is relatively short or has a small diameter. In fact, the blossom end of a small pear may even be below the upper rim of the cup.

If the pear 80 is relatively large, for example, the cam followers 475 just barely enter the second sections 481 of the camming slots 479 during continued downward movement of the housing 270 and sleeve 405, causing the sleeve to slide down along, that is relative to, the housing just a slight distance whereby the lower washer 421 engages the upper edge 431 of the ring 425 after nearly a maximum of downward movement of the sleeve relative to the gauging ring. Thus, the knife projects relatively deeply into the pear so that it is fitted within the seed cell 87 of the large pear.

If a relatively small pear 80 is in a cup 55, the cam followers 475 move farther into said second slot sections 481 and may even move into engagement with the outer ends 486 of the camming slots 479 whereupon the sleeve 405 slides down along the housing 270 a considerable distance. Thus, the lower washer 421 engages the upper edge 431 of the ring 425 after only a minimum of downward movement of the sleeve relative to the gauging ring. Thus, the knife projects only a slight distance into the pear but is correspondingly fitted within the seed cell of the small pear. From this description, it is evident that the amount of axial movement permitted the knife by the depth control mechanism 400 is predetermined in the design of the slots 479, the cam followers 475, the levers 493, and associated structure, to correspond to the locations of the seed cells within the usual sizes of the pears being processed.

After the knife 325 is located in the proper axial position with respect to the pear 80, it is necessary to swing, or expand, the knife outwardly so that it can cut out the seed cell 87. Since larger pears have larger seed cells than smaller pears, it is necessary to swing the knife farther out in large pears than in small pears. To understand how the subject apparatus swings the knife out just the proper amount, it is first to be noted that if a large pear is being processed, the downward travel of the housing 270 (FIG. 3) is stopped sooner than when a small pear is being processed because in the former instance, the surface 427 of the ring 425 contacts the pear sooner. Thus, just as soon as downward movement of the housing is stopped when the lower washer 421 engages the upper edge 431 of the ring, the knife actuating lever 378 swings downwardly relatively to the housing since the lever's downward pivoting movement follows downward movement of the main support bracket B, it being noted that said support bracket continues to move downwardly after the housing has stopped its downward movement. The important point to understand is that since the housing stops sooner, that is at a high elevation relative to the upper run 70, with large pears than with small pears, the knife actuating lever swings through a greater arc with large pears than it does with small pears. The net result, therefore, is to impart greater pivotal movement to the knife with larger pears than with smaller pears. Once again, the apparatus is initially designed to provide pivotal movement of the knife in accordance with the usual sizes of fruit being processed.

The knife 325 is rotating continuously during the foregoing operations so that when it is properly positioned in the pear 80, as above described, it cuts out the seed cell 87 thereby cleaning out the pear cavity. The calyx knives 388 simultaneously cut out the calyx in the blossom end 85 of the pear.

The coring knife 325 is then retracted and withdrawn from the pear 80 by upward movement of the main support bracket B. During initial upward travel of the support bracket, the knife actuating lever 378 pivots upwardly and returns the coring knife to its retracted, axially aligned position. When the channel 140 engages the cushion 141 on the respective support plate 246, the housing 270 is lifted upwardly and withdraws the knife from the pear and eventually moves the gauging ring 425 out of fruit engagement. The coring unit CU is lifted into its uppermost position while the carrier frame F swings rearwardly so that when the coring unit is vertically aligned with another pear 80 to be cored in its lane of pears, said coring unit is ready to repeat its downward movement with the main support bracket B.

After the pears 80 have been cored at the coring station 82, they advance on the conveyor C toward the forward shaft 41 (FIG. 2). As each row of pears moves into the splitting station 596 (FIG. 3), in successsion the lifting fingers 518 come up under the pears, the knife rods 508 enter the cored-out bores of the pears and the fingers, the opening springs 535 engage the inner segments 56f and open the cups, the splitting blades cut substantially along the way through the pears, and the lifting fingers lift the pears out of their cups to complete the splitting action and to unseat the pears.

In order to control upward and downward movement of the lifting fingers 518, a fruit lifting cam 610 (FIG. 1) is secured to the camshaft 540 and has an annular track receiving the cam follower 533 therein. As the camshaft rotates, the fruit lifting cam rocks the levers 528 thereby to raise and to lower the fruit lifter L (FIG. 2). Therefore, as each row of cup 55 moves through the splitting station, the fingers are raised and lowered as above described. Elevational movement of the cup opener CO is controlled by an opener cam 615 secured to the camshaft and receiving the follower 539a. As is now believed understood, the opener cam lifts the springs 535 into cup opening contact just prior to splitting and lowers these springs following opening of the cups. It is evident that when the processed fruit 80 reaches the forwardmost end of the conveyor C, it is readily discharged from the conveyor onto a discharge conveyor 620.

Summary of operation

In briefly summarizing the operation of the present invention, the motors 542 and 600 (FIG. 1) are energized and whole, usually peeled pears 80 are placed, stem ends down, in all of the cups 55 as the latter move along the conveyor support portion 35 (FIG. 2). The jaw walls 56 of all the cups are in retracted positions where they remain until just before reaching the stemming station 81. As a flight 48 or row of cups filled with unstemmed and uncored pears moves into the stemming station 81, the stemming units SU are vertically aligned or indexed with the cups in said row by the carrier frame F. Simultaneously, uncored pears in a forward row of cups are at the coring station 82 where the coring units CU are vertically aligned with the cups in said forward row. At this instant the carrier frame is at its rearwardmost position. An instant later, the carrier frame is moved forwardly at the same velocity as the upper run 70 of the conveyor C. Just before these rows of cups move into the stemming and coring stations, cam actuation of valve 130 operates valve 131 and causes the rams 128 to project into engagement with the jaw wall arms 59 thereby moving the jaw walls into fruit gripping positions thereby axially centering and holding the pears.

As the carrier frame F moves forwardly with the conveyor C, the main usport bracket B is moved downwardly to project the flight aligning rods 205 through the holes 49 (FIG. 1) and to bring the seating heads 164 (FIG. 4) into engagement with unstemmed pears 80 to seat the same. At about the same time, the gauging rings 425 are brought into engagement with the uncored pears.

Next and in succession, the stemming tubes 172 are forced through the unstemmed pears 80, the pistons 182 are moved upwardly to apply suction on the stem ends 86 of the pears, and thereafter the ejector rods 184 are moved downwardly relatively to the tubes to eject the cutout stem segments from the tubes.

Substantially simultaneously, the coring knives 325 enter the stemmed but uncored pears to the locations of the cells 87 and expand, both the depth or extent of entry and the expansion corresponding to the sizes of the respective pears, thereby to cut out the cells from the pears. All of the fruit material which is removed from the pears is discharged into the drain pan 505, it being noted that the deflectors 129 deflect fruit particles into the pan.

Just before the carrier frame F reaches its forwardmost position, all of the stemming tubes 172 and the coring knives 325 are withdrawn from their respective pears 80. As the stemming tubes are moved upwardly out of the cups 55, the latch mechanisms LM prevent upward movement of the heads by the pears and thereby facilitate withdrawal of the tubes from the pears. The carrier frame then swings rearwardly to index with following rows of cups 55 and to repeat the action above described. Before the carrier frame moves rearwardly, however, the rams 128 are retracted by cam operation of the valves 130 and 131 and/or by downward movement of the presser plate 133, but even if the fingers 128f of the rams strike the flights 48, they simply flex forwardly. As the cored rows of pears advance into the splitting station 596, the jaw walls 56 are retracted and the pears are split and lifted from the cups 55 by the cooperating blades 509 and fingers 518 and are finally discharged from the conveyor C.

From the foregoing it will be evident that the apparatus of the subject application stems and cores fruit accurately and without damaging the fruit. This apparatus is particularly noteworthy in that prior to and during stemming and coring, the fruit are positively held and axially centered by the conveyor cups but are released from the cups following coring and just before splitting. Following stemming, the apparatus holds the fruit in the cups to facilitate withdrawal of the stemming tubes. During coring of the fruit, the coring knife projects into the fruit, and swings outwardly therewithin, by amounts corresponding to the size of the fruit so as to clean out the seed cell of such fruit; this coring action is performed while minimizing contact of the coring unit with the fruit and while minimizing imposition of the weight of the unit on the fruit. It is clear, therefore, that apparatus embodying the principles of the present invention offers several significant advantages.

Although a preferred embodiment of the present invention has been shown and described, it will be understood that various changes and modifications may be made in the details thereof without departing from the spirit and the scope of the appended claims.

We claim:

1. A fruit processing apparatus comprising means for conveying fruit along a predetermined path and for grasping the fruit as it is moved along said path to maintain the fruit in predetermined position and for subsequently releasing the fruit; a stemming tube; means for thrusting said tube through the fruit on said conveying means to provide a bore in each fruit; means engaging the fruit prior to thrusting of said tube for seating the fruit in said conveying means whereby the fruit is held in said position during stemming thereof; latch means for preventing movement of said seating means away from said fruit while said tube is being withdrawn from the fruit thereby to enable withdrawal of the tube from the fruit and for allowing concurrent movement of said seating means and tube away from the fruit after the tube has been withdrawn from the fruit; a coring knife; means supported on said thrusting means and engageable with the surface of the fruit for inserting said knife into the bore of a stemmed fruit on said conveyor to the depth of the seed cell of the fruit; means for rotating said knife while in said bore for cleaning out said seed cell; a rack mounted in substantially fixed spaced relation to said conveying means; a locking pawl mounted on said knife inserting means for movement between projected and retracted positions, said inserting means including means for moving said pawl into projected position, when said inserting means has traveled a predetermined distance toward said fruit, and into engagement with said rack to preclude further movement of said inserting means toward said fruit; a splitting blade mounted on said thrusting means in spaced relation to said stemming tube, said coring knife being located between said tube and said blade with respect to said path, said thrusting means thrusting said blade through said fruit following coring thereof; means engageable with said conveyor prior to and during stemming and coring of the fruit by said tube and knife, respectively, for causing said conveying means to grasp said fruit during stemming and coring thereof; means engageable with said conveyor prior to engagement of said splitting blade with the fruit for causing said conveying means to release said fruit during splitting thereof; and means for lifting fruit from said conveying means just prior to completion of splitting by said blade for unseating the fruit from said conveying means and for assisting in splitting the fruit.

2. A fruit processing apparatus comprising a main frame, means mounted in said main frame for conveying fruit in a predetermined direction along a substantially horizontal path and for grasping each fruit so as to hold it with its stem blossom axis substantially upright, a carrier frame mounted in said main frame for fore and aft movement above said path, drive means mounted in said main frame having driving connection to said conveying means and to said carrier frame for moving said conveying means in said predetermined direction and for reciprocating said carrier frame first forwardly at the same speed as said conveying means and thence rearwardly, a main support bracket mounted in said carrier frame for elevational movement toward and away from said path, means driven by said drive means for successively lowering and raising said main support bracket during forward movement of said carrier frame, a stemming tube rigidly mounted on said bracket for elevational movement therewith thereby to stem fruit on said conveying means during concurrent forward movement of said bracket and said conveying means, a coring knife, means supporting said knife on said bracket forwardly of said stemming tube so that said knife is lowered by said bracket into the bore cut out of each fruit by said stemming tube and so that the extent of entry of said knife lengthwise into and the movement radially outwardly within the bore is controlled by the amount the fruit projects upward from said path, means on said main frame for rotating said knife, releasably engageable locking means on said knife supporting means and said carrier frame for stopping downward movement of said knife thereby to prevent application of a crushing weight on the fruit by said knife supporting means, and a splitting blade mounted on said main support bracket for elevational movement therewith thereby to split fruit on said conveying means following coring of the fruit and during concurrent forward movement of said bracket and said conveying means.

3. A fruit processing apparatus comprising a main frame; a conveyor mounted in said main frame and including a lane of cups, said cups having open positions for receiving and releasing fruit and closed positions for grasping and centering fruit with their axes substantially upright, said lane of cups being movable in a predetermined direction along a substantially horizontal path successively past stemming, coring, and splitting stations; a carrier frame mounted in said main frame for fore and aft movement above said path; drive means mounted in said main frame having driving connection to said conveyor and to said carrier frame so as to move said lane of cups in said predetermined direction along said path and so as to reciprocate said carrier frame first forwardly at the same speed as said lane of cups and thence rearwardly; front and rear fluid operated rams mounted on said carrier frame beneath said path having projected positions engaging spaced cups in said lane for moving said cups to closed positions and having retracted positions disengaged from said cups; means actuated by said drive means for moving said rams into projected positions during forward movement of said carrier frame and prior to and during movement of said engaged cups through said stemming and coring stations, respectively, and for moving said rams into their retracted positions before and during rearward movement of said carrier frame; cup opening means positioned under said path and being mounted on said carrier frame for movement toward said path and into engagement with said cups as they travel through said splitting station and for subsequent movement away from said path; a tubular fruit lifting finger; means mounting said finger on said carrier frame and below said path for movement toward and away from said path at said splitting station, said cup opening means having an aperture receiving said finger during movement of the finger toward and away from said path; a main support bracket mounted in said carrier frame for elevational movement toward and away from said path; means actuated by said drive means for lowering and raising said bracket during forward movement of said carrier frame, a stemming tube rigidly mounted on said bracket for elevational movement therewith thereby to stem fruit in said cups as they move through said stemming station during concurrent forward movement of said bracket and said lane of cups; a coring knife; means supporting said knife on said bracket forwardly of said stemming tube so that said knife is lowered by said bracket into the bores of fruit as the same pass through said coring station and so that the extent of entry of said knife lengthwise into said bores and the movement of said knife radially outwardly within said bores is controlled by the amount the fruit projects upward from their respective cups; means on said main frame for rotating the knife; releasably engageable locking means on said knife supporting means and said carrier frame for limiting downward movement of the knife relative to said carrier frame thereby to prevent application of crushing weight on the fruit; a splitting blade rigidly mounted on said bracket in forwardly spaced relation to said coring knife for elevational movement with said bracket thereby to split fruit in said cups during travel thereof through said splitting station; a guide rod projecting downward from said splitting blade for movement through each cup and into said lifting finger prior to engagement of the splitting blade with fruit in such cup; means actuated by said drive means for lifting said finger toward said path as said splitting blade and its guide rod are lowered toward said path thereby to position said finger for reception of said guide rod, and means actuated by said drive means for lifting said cup opening means into engagement with the cups during travel thereof through said splitting station and the following entry of said guide rod into said finger but prior to engagement of said blade with the fruit for moving said cups into their open positions prior to splitting of the fruit by said splitting blade.

4. A fruit processing apparatus comprising a main frame; a conveyor mounted in said main frame and including a lane of cups having open positions for receiving and releasing fruit and closed positions for grasping and centering fruit with their axes substantially upright, said lane of cups being movable in a predetermined direction along a substantially horizontal path successively past stemming, coring, and splitting stations; a carrier frame mounted in said main frame for fore and aft movement above said path; drive means mounted in said main frame having driving connection to said conveyor and to said carrier frame so as to move said lane of cups in said predetermined direction along said path and so as to reciprocate said carrier frame first forwardly at the same speed as said lane of cups and thence rearwardly; front and rear fluid-operated rams mounted on said carrier frame beneath said path having projected positions engaging spaced cups in said lane for moving said cups to closed positions and having retracted positions disengaged from said cups; means actuated by said drive means for moving said rams into projected positions during forward movement of said carrier frame and prior to and during movement of the cups through said stemming and coring stations, respectively, and for moving said rams into their retracted positions before and during rearward movement of said carrier frame; cup opening means positioned under said path and being mounted on said carrier frame for movement toward said path and into engagement with said cups as they travel through said splitting station and for movement away from said path; a tubular fruit lifting finger; means mounting said finger on said carrier frame and below said path for movement toward and away from said path at said splitting station, said cup opening means having an aperture receiving said finger during movement of the finger toward and away from said path; a main support bracket mounted in said carrier frame for elevational movement toward and away from said path; means actuated by said drive means for successively lowering and raising said bracket during forward movement of said carrier frame; a seating head supported on said bracket but being movable upwardly relatively thereto, said head being lowered into engagement with fruit at said stemming station when said bracket is lowered for bearing downward on and seating the fruit in its respective cup; a stemming tube rigidly mounted on said bracket and slidably extended through said head for penetration through said fruit following engagement thereof by said head and upon further lowering of said bracket; latch means mounted on said carrier frame, said bracket, and said seating head for precluding upward movement of said head relative to said carrier frame and said conveyor as said bracket lifts said stemming tube out of a stemmed fruit if said fruit bears upward against said seating head, said latch means being released when said stemming tube is completely withdrawn from said fruit to allow concurrent upward movement of said tube and head; a coring knife; means supporting said knife on said bracket forwardly of said stemming tube so that said knife is lowered by said bracket into the stemmed-out bores of fruit as the same pass through said coring station and so that the extent of entry of said knife lengthwise into said bores and the movement of said knife radially outwardly within said bores is controlled by the distance the fruit projects upward from their respective cups; means on said main frame for rotating the knife; releasably engageable locking means on said knife supporting means and said carrier frame for limiting downward movement of the knife relative to said carrier frame thereby to prevent application of crushing weight on the fruit; a splitting blade rigidly mounted on said bracket in forwardly spaced relation to said coring knife for elevational movement with said bracket thereby to stem fruit in said cups during travel thereof through said splitting station; a guide rod projecting downward from said splitting blade for movement through each cup at said splitting station and into said lifting finger prior to engagement of the splitting blade with fruit in such cup; means actuated by said drive means for lifting said finger toward said path as said splitting blade and said guide rod are lowered toward said path thereby to position said finger for reception of said guide rod; and means actuated by said drive means for lifting said cup opening means into engagement with the cups during travel thereof through said splitting station and following entry of said guide rod into said finger for moving said cups into their open positions prior to splitting of the fruit by said splitting blade.

5. In a fruit processing apparatus, a conveyor for bodily carrying whole fruit along a predetermined path including a cup having a pair of rigidly interconnected spaced confronting side walls and a pair of movable jaw walls mounted between said side walls in confronting relation to each other and for movement toward each other into a fruit gripping position wherein fruit positioned between said side walls is gripped between said jaw walls and for movement away from each other into a retracted position wherein the fruit can be received into and released from said cup, and means mounted adjacent to said path and engageable with said jaw walls for moving said jaw walls into one of said positions.

6. In combination, a conveyor for bodily carrying whole fruit along a predetermined path including a cup having a pair of rigidly interconnected spaced confronting side walls and a pair of movable jaw walls mounted between said side walls in confronting relation to each other and for movement toward each other into a fruit gripping position wherein fruit positioned between said side walls is gripped between said jaw walls and for movement away from each other into a retracted position wherein the fruit can be received into and released from said cup, said jaw walls including interengageable means effecting equal movement of both of said jaw walls into and out of said positions in response to movement of one of said jaw walls into and out of its positions, and means mounted adjacent to said path and engageable with one of said jaw walls for moving the same into one of its positions.

7. In a fruit processing apparatus, a conveyor for carrying fruit along a predetermined path including a cup having a pair of spaced confronting side walls and a pair of movable jaw walls mounted between said side walls in confronting relation to each other and being unitarily movable toward each other into a fruit gripping position wherein fruit positioned between said side walls is gripped between said jaw walls and for movement away from each other into a retracted position wherein the fruit can be received into and released from said cup, and an arm rigidly outwardly projecting from one of said jaw walls; means for actuating said conveyor to advance said cup successively to a plurality of stations, and means mounted adjacent to said path and engageable with said arm for moving said jaw walls into said gripping positions.

8. In combination, a support, a conveyor mounted in said support for bodily carrying whole fruit along a predetermined path, said conveyor including a cup having a pair of fixed side walls and a pair of movable jaw walls, said movable jaw walls being mounted in confronting relation to each other for unitary pivotal movement toward and away from a fruit gripping position wherein fruit positioned in the cup is dependably held therein, and means mounted in said support adjacent to said path and including a ram movable into engagement with one of said jaw walls for moving said walls into said fruit gripping positions.

9. In combination with a conveyor for bodily carrying fruit along a predetermined path and for dependably holding said fruit in predetermined position, said conveyor including a cup having a pair of spaced rigidly interconnected confronting side walls, a pair of movable jaw walls mounted between said side walls in confronting relation to each other and for pivotal movement toward each other into a fruit gripping position wherein fruit positioned between said side walls is gripped between said jaw walls and for movement away from each other into a retracted position wherein the fruit can be received into and released from said cup, and resiliently deformable means interposed between said jaw walls and said side walls for yieldably resisting pivotal movement of said jaw walls and for movement away from each other mounted adjacent to said path and engageable with said jaw walls for moving said jaw walls into one of said positions, said side walls having confronting surfaces in the form of frusto-conical segments maintaining alignment of the fruit supported therein prior to moving the jaw walls into said gripping position.

10. In combination, a support, a conveyor mounted adjacent said support for carrying fruit along a predetermined linear path at a predetermined speed, means for oscillating said support so that said support moves in the same direction and at the same speed as said conveyor for a portion of its travel and in a reverse direction during the remainder of its travel, said conveyor including a cup having a pair of movable jaw walls mounted in confronting relation to each other for unitary pivotal movement toward each other into a fruit gripping position and away from each other into a fruit releasing position, a resiliently flexible member, and means mounting said member in said support for movement toward said path into engagement with one of said walls when said support is moving in the same direction as said conveyor thereby to move said walls into one of the said positions and for movement away from said path out of engagement with said one wall when said support is moving in a reverse direction.

11. The combination of claim 10 wherein each of said jaw walls has a pivot axis about which said pivotal movement occurs, wherein said one jaw wall has an arm projecting outward from the pivot axis of said one wall, wherein said member is a finger adapted for alignment with said arm, and wherein said member mounting means is a fluid operated ram that moves said jaw walls into their gripping position when it moves said finger into engagement with said arm.

12. The combination of claim 10 wherein each of said jaw wall has a pivot axis about which said pivotal movement occurs, wherein said walls have inner segments projecting inward from their respective pivot axis toward the opposite segment, wherein said member is a leaf spring located in a plane generally parallel to a plane containing said pivot axes and being positioned by said mounting means below said inner segments, and wherein said mounting means is operable to move said spring into engagement with said segments for moving said jaw walls into their fruit releasing position.

13. In a fruit processing apparatus, a main frame, a conveyor mounted in said main frame and providing a fruit supporting cup movable along a path in a predetermined direction, said cup including a jaw wall movable into and out of a fruit gripping position and an arm projecting from said wall for effecting movement of said wall, a carrier frame, means mounting said carrier frame in said main frame for oscillatory movement adjacent to said path in said predetermined direction and in a direction opposite thereto and about an axis disposed transversely of said path, a fluid-operated ram mounted on said carrier frame for alignment with said arm during movement of said carrier frame in said predetermined direction and for projection toward and retraction away from said arm, drive means for moving said conveyor cup in said predetermined direction and for moving said carrier frame in said predetermined direction at the same speed as said cup with said ram in alignment with said arm, said drive means also being operable to move said carrier frame in said opposite direction relative to said cup, means for projecting said ram during movement of said carrier frame in said predetermined direction so that the ram is moved into engagement with said arm and said wall is in fruit gripping position and for retracting said ram prior to movement of said carrier frame in said opposite direction so that said ram is disengaged from said arm.

14. The apparatus of claim 13 wherein said ram has a resiliently flexible portion engageable with said arm whereby upon failure of said ram to retract, the rearwardly moving resiliently flexible portion can wipe against the forwardly moving conveyor without breaking said flexible portion or impeding movement of said conveyor and carrier frame.

15. In a fruit processing apparatus, a main frame, a conveyor mounted in said main frame and providing a fruit supporting cup movable along a path in a predetermined direction, said cup including a jaw wall movable into and out of a fruit gripping position and an arm projecting from said wall for effecting movement of said wall, a carrier frame, means mounting said carrier frame in said main frame for oscillatory movement adjacent to said path in said predetermined direction and in a direction opposite thereto and about an axis disposed transversely of said path, a fluid-operated ram mounted on said carrier frame for alignment with said arm during movement of said carrier frame in said predetermined direction and for projection toward and retraction away from said arm, drive means for moving said conveyor cup in said predetermined direction and for moving said carrier frame in said predetermined direction at the same speed as said cup with said ram in alignment with said arm, said drive means also being operable to move said carrier frame in said opposite direction relatively to said cup, means for projecting said ram during movement of said carrier frame in said predetermined direction so that the ram is moved into engagement with said arm and said wall is in fruit gripping position, a presser plate mounted in said carrier frame for movement toward and away from said path and for engagement with said ram during movement away from said path for moving said ram into retracted position, and means for moving said plate away from said path as said carrier frame completes its movement in said predetermined direction and for moving said plate toward said path during movement of said carrier frame in said opposite direction.

16. A cup for grasping and orienting fruit having a stem blossom axis comprising a pair of spaced upstanding side walls having confronting recesses therein, a bowl portion extending between said side walls with said recesses extending upward from said bowl portion, said bowl portion circumscribing an opening passing completely therethrough, bosses rigidly secured to said bowl portion and projecting in opposite directions therefrom between said side walls, jaw walls individually pivotally mounted on said bosses on opposite sides of said bowl portion and between said side walls for movement between a fruit grasping position wherein a fruit supported in said bowl portion and located in said recesses is grasped between said jaw walls and a retracted position wherein the jaw walls relieve their grip on said fruit, said jaw walls having meshing gear portions for effecting unitary movement of said jaw walls, and an arm projecting outward from one of said jaw walls for effecting movement of said jaw walls upon application of pressure to said arm.

17. A cup for grasping and orienting fruit comprising a pair of spaced upstanding side walls, a bowl portion extending between said side walls with said side walls projecting upward from said bowl portion, jaw walls individually pivotally mounted on opposite sides of said bowl portion and between said side walls for movement between a fruit grasping position wherein a fruit supported in said bowl portion is grasped between said jaw walls and a retracted position wherein the jaw walls relieve their grip on said fruit, and resiliently compressible, annular, concave-convex washers circumscribing the respective pivot axes of the jaw walls and bearing against said side walls and said jaw walls for resisting pivotal movement of said jaw walls relative to said side walls.

18. A fruit holding cup comprising a pair of spaced confronting stationary side walls having upper fruit receiving recesses therein, a lower bowl portion interconnecting said stationary walls and circumscribing an upper annular surface diverging downwardly from said recesses and a lower bore opening outward of said bowl portion, bosses projecting in opposite directions from said bowl portion between and downward from said stationary walls, jaw walls slidably received between said stationary walls on opposite sides of said bowl portion and including mounting portions on opposite sides of the bosses adjacent thereto, pivot pins extending through adjacent mounting portions and bosses whereby said jaw walls are mounted for pivotal movement toward each other into socket forming relation with said recesses for gripping a fruit in said cup and away from each other into retracted positions for releasing and receiving fruit, said mounting portions having gear teeth in mesh with the gear teeth on the mounting portions of the opposite jaw wall whereby said jaw walls are unitarily pivotable, said mounting portions also having actuating arms extending outwardly from said cup on the opposite side of their corresponding pivot pin from said mounting portions whereby upward pressure on said mounting portions is effective to move said jaw walls into retracted positions whereas upward pressure on said arms is effected to move said jaw walls into fruit gripping positions, and cup-shaped washers circumscribing said pivot pins and bearing against said bosses and the adjacent mounting portions, said washers being resiliently compressible axially of their respective pivot pins for resisting pivotable movement of said jaw walls.

19. A fruit processing apparatus comprising a conveyor including a plurality of cups movable in a predetermined forward direction along a substantially horizontal path past a core removing station, each of said cups having an annular portion circumscribing an upright axis for the cup and jaw members movable about individual horizontal pivot axes spaced on opposite sides of said cup axis between open and closed positions for gripping and releasing fruit in the cup; a carrier frame mounted for forward and rearward oscillating movement over said path; a main support bracket; means mounting said bracket for elevational movement on said carrier frame toward and away from said path; motivating means for said conveyor, said carrier frame, and said bracket for imparting forward movement to said carrier frame at substantially the same speed as said cups move along said path and for moving said bracket toward said path during forward movement of said frame; a core removing unit having a fruit penetrating member; means mounting said unit on said bracket for elevational movement therewith between a core removing position with said penetrating member engaging said fruit in one of the cups at said core removing station and a retracted position with said penetrating member withdrawn from said fruit, said penetrating member being axially aligned with a cup at said core removing station during forward movement of said bracket, to permit movement of said member into core removing position, and means borne by said carrier frame and displaced from said pivot axes for moving said jaw members to closed positions prior to and during movement of each cup through said core removing station and for removing said jaw members into open positions following movement of each cup out of said core removing station.

20. A fruit stemming apparatus comprising a frame, a fruit supporting cup, a mounting member mounted in said frame for movement toward and away from said cup, a lifter member rested on said mounting member and being separable therefrom, a shank secured to said lifter member and projecting toward said cup, a fruit seating head secured to said shank for movement into engagement with said fruit in the cup upon movement of the mounting member toward said cup, a stemming tube rigidly connected to said mounting member for movement therewith into fruit penetrating engagement following engagement of said head with the fruit, said mounting member being movable away from said lifter member after said head engages the fruit and as said tube penetrates more deeply into the fruit, and means on said lifter member, said frame, and said mounting member for precluding movement of the head away from the cup when the stemming tube is moved away from the cup and thereby forces the fruit against said head so as to facilitate withdrawal of the tube from the fruit following stemming thereof, said means permitting movement of the head away from the cup when said mounting member moves into adjacency with said lifter member whereupon said mounting member simultaneously moves both said head and said tube away from said cup.

21. In a fruit stemming apparatus including a frame, a fruit supporting cup, a mounting member mounted in said frame for movement toward and away from said cup, a lifter member rested on said mounting member but being separable therefrom, a shank secured to said lifter member and projecting toward said cup, a fruit seating head secured to said shank for movement into engagement with fruit in said cup upon movement upon said mounting member toward said cup, and a stemming tube rigidly connected to said mounting member for movement therewith into fruit penetrating engagement following engagement of said head with the fruit, said mounting member being movable away from said lifter member after said head engages said fruit and as said tube penetrates more deeply into the fruit; a mechanism for facilitating withdrawal of the tube from the fruit following stemming thereof comprising a latch mounting post secured to and projecting away from said lifter member, a latch release pin secured to said mounting member and slidably projecting through the lifter member, a latch plate having a first end rested on said pin when said lifter member rests on said mounting member and being spaced from the pin when the lifter member and mounting member are separated and a second end loosely receiving said mounting post, and a latch rod secured to said frame and slidably extending through said lifter and mounting members and loosely through said latch bar between said pin and post so that upon movement of the mounting member toward the cup and the stemming tube into fruit penetrating engagement, the pin separates from the latch plate and so that as the stemming tube is subsequently withdrawn from the fruit, the latch plate is forced into binding engagement with the latch rod if the stemming tube urges the fruit against said seating head whereby the head is maintained against the fruit and the fruit is maintained in the cup, said latch plate being released from binding engagement with the rod when said mounting member moves said pin into engagement with said first end of the latch plate so as to permit the mounting member to move said head away from said cup.

22. The mechanism of claim 21 wherein a retaining arch is secured to the lifter member and arches over the pin in spaced relation thereto and over said first end of the latch plate, said first end of the latch plate being retained over the pin by said arch, and said arch limiting movement of said latch's first end by said pin away from cup and relative to the latch's second end during movement of said mounting member away from said cup thereby to preclude binding of said latch plate against said rod by force placed against said latch plate by said pin.

23. In a fruit processing apparatus, a frame, means in said frame for supporting a fruit to be cored, an elongated coring knife terminating in a fruit pentrating end, fruit engaging depth control means, means interconnecting said depth control means and said knife for movement of said control means longitudinally of the knife toward and away from said end thereof, means mounting said interconnecting means in said frame for moving said knife in the direction of its length toward and away from said supporting means for inserting said penetrating end into a fruit on said supporting means and for bringing said control means into engagement with said fruit, and means connected to said control means for varying the spacing between said control means and said penetrating end as said control means approaches said supporting means.

24. In an apparatus for coring fruit in accordance with the size thereof, a frame, means mounted in said frame for supporting a fruit to be cored, a housing supported in said frame for movement in a predetermined path toward and away from said supporting means, a coring knife mounted within said housing and having an end directed toward said supporting means for entering a fruit on said supporting means upon movement of said housing toward said supporting means, a depth control sleeve slidably mounted on said housing for movement longitudinally of said path toward and away from said supporting means, a depth gauging ring circumscribing said knife in endwardly spaced relation to said sleeve, means mounting said ring on said sleeve for movement of said sleeve and said ring relative to each other and longitudinally of said path between a depth limiting position with said ring in engagement with said sleeve and a position with said ring and sleeve spaced apart, said knife projecting from said gauging ring toward said supporting means, said ring being engageable with said fruit subsequent to entry of the knife thereinto, the dimension measured lengthwise of said knife between its end and said ring determining the extent of the entry of the knife into the fruit, said housing and therefore said sleeve being movable toward said supporting means after said ring engages said fruit thereby progressively increasing said dimension until said sleeve engages said ring, and means mounted on said frame and connected to said sleeve for moving said sleeve relative to said housing toward said ring if said housing moves more than a predetermined distance toward said supporting means whereby said lengthwise dimension is greater for larger fruit than it is for smaller fruit.

25. In a fruit coring apparatus, a frame, means mounted in said frame for supporting a fruit to be cored whereby fruit of large size projects farther upward from said supporting means than fruit of smaller size, a substantially cylindrical housing supported in said frame for movement in a predetermined path toward and away from said supporting means, a coring knife having a fruit penetrating end, means mounting knife for rotation within said housing and against axial movement therein and with said end of the knife projecting outward from said housing toward said supporting means thereby to enter a fruit on said supporting means upon movement of said housing toward said supporting means, a depth control sleeve slidably mounted on said housing and including an annular end portion circumscribing said knife and movable relatively to said knife lengthwise of said housing, a gauge ring, means slidable on said sleeve mounting said gauge ring in circumscribing relation to said knife and in axially spaced relation to said annular portion, spring means positioned between said ring mounting means and said sleeve for yieldably urging said ring away from said annular portion, said ring being engageable with fruit to be cored following entry of said knife into the fruit whereby continued movement of said housing and sleeve toward said supporting means moves said annular portion into engagement with said ring and spaces said end farther out from said ring, the axial spacing between said ring and said end of the knife when said annular portion and ring are in engagement determining the extent of entry of the knife into the fruit, and means mounted on said frame and connected to said sleeve for progressively moving said sleeve along said housing and toward said supporting means if said housing moves within a predetermined distance from said supporting means whereby the knife enters deeper into fruit which projects farther from said supporting means than into fruit which does not project as far from said supporting means.

26. In an apparatus for coring fruit in accordance with the size thereof, a frame, means mounted in said frame for supporting a fruit to be cored, a housing supported in said frame for movement in a predetermined path toward and away from said supporting means, a rack mounted in said frame and extending lengthwise of and adjacent to said path, a coring knife mounted within said housing and having an end directed toward said supporting means for entering a fruit on said supporting means upon movement of said housing toward said supporting means, a depth control sleeve slidably mounted on said housing for movement longitudinally of said path toward and away from said supporting means, a depth gauging ring circumscribing said knife in endwardly spaced relation to said sleeve, means mounting said ring on said sleeve for movement of said sleeve and said ring relative to each other and longitudinally of said path, means mounted on said frame and connected to said sleeve for progressively moving said sleeve along said housing and toward said ring when said housing moves within a predetermined distance from and continues toward said supporting means, a pawl pivotally mounted on said ring mounting means for movement transversely of said path between a projected locking position and a retracted position, and means for pivoting said pawl into locking position upon predetermined relative movement of said sleeve and ring toward each other after said ring engages fruit in said supporting means whereby upon predetermined movement of said housing toward said supporting means, said pawl is moved into locking engagement with said rack thereby to preclude further movement of said housing toward said supporting means.

27. The apparatus of claim 26 including an abutment mounted on said frame adjacent to said path and between said rack and said supporting means, and a block secured to said ring mounting means and positioned between said pawl and said ring for engaging said abutment when there is no fruit in said supporting means to limit movement of said housing toward said supporting means.

28. In an apparatus for coring fruit, a dampening piston mounted on said frame, means mounted in said frame for supporting a fruit to be cored, a housing supported in said frame for movement in a predetermined path toward and away from said supporting means, a dampening cylinder secured to said housing in axial alignment with said piston for entry of said piston into said cylinder during movement of said housing toward said supporting means, said cylinder and housing having a restricted air outlet passageway opening to the atmosphere, a check valve in communication with said cylinder for releasing air under predetermined pressure from said cylinder and for freely admitting air into said cylinder, and means mounted on the housing and engageable with fruit in said supporting means for blocking passage of air out of said passageway upon engagement with said fruit whereby said predetermined pressure is built up in said cylinder to release air through said check valve.

29. In a fruit processing apparatus, a frame a cup mounted in said frame having jaw members movable between a closed position for grasping fruit and an open position, a support bracket, means mounting said bracket for movement toward and away from said cup, a splitting blade mounted on said bracket for movement therewith toward said fruit to split the same and thence away from the fruit, a cup opener member, means mounting said opener member under said cup for movement into cup engagement thereby to open the cup and thence out of cup engagement, a tubular finger mounted under said cup for movement toward said cup and into engagement with the lower end of the fruit to unseat the fruit from said cup and powered means connected to said bracket, to said fingers, and to said opener mounting means for moving said opener member into cup engagement to open said cup and to move said finger into engagement with the lower end of the fruit just prior to engagement of said splitting blade with the fruit in the cup.

30. In a fruit processing apparatus, a frame, a cup circumscribing an axial opening extending through the cup, said cup being mounted in said frame and having jaw members movable between a closed position for grasping fruit and an open position, a support bracket, means mounting said bracket for movement toward and away from said cup, a splitting blade mounted on said bracket for movement therewith toward said fruit to split the same and thence away from the fruit, a guide rod projecting from said blade and adapted to pass through said opening upon movement of the bracket toward said cup thereby to guide the blade into fruit splitting engagement, a tubular guide finger, means mounting said finger under said cup for movement toward said cup into adjacent axially aligned relation with said opening for receiving and guiding said rod and thence away from the cup, a cup opener member, means mounting said opener member under said cup for movement into cup engagement thereby to open the cup and thence out of cup engagement, and powered means connected to said bracket and to said opener and finger mounting means for moving said finger toward said cup as said blade moves toward said fruit and for moving said opener member into cup engagement just prior to engagement of said splitting blade with the fruit in the cup, said powered means further moving said finger mounting means toward said cup for lifting said fruit out of said cup before said blade contacts said cup to complete the splitting of the fruit and to unseat the fruit from the cup.

31. A cup for grasping and orienting fruit having a stem blossom axis comprising a pair of spaced upstanding side walls having confronting recesses therein, a bowl portion rigid with and extending between said side walls with said recesses extending upward from said bowl portion, said bowl portion circumscribing an opening passing completely therethrough, bosses rigidly secured to said bowl portion and projecting in opposite directions therefrom between said side walls, jaw walls individually pivotally mounted on said bosses on opposite sides of said bowl portion and between said side walls for movement between a fruit grasping position wherein a fruit supported in said bowl portion and located in said recesses is grasped between said jaw walls and a retracted position wherein the jaw walls relieve their grip on said fruit, and means interconnecting said jaw walls for unitary movement.

32. A cup for grasping and orienting fruit comprising a pair of spaced upstanding side walls, a bowl portion extending between said side walls and said side walls projecting upward from said bowl portion, jaw walls individually pivotally mounted on opposite sides of said bowl portion and between said side walls for movement between a fruit grasping position wherein a fruit supported in said bowl portion is grasped between said jaw walls and a retracted position wherein the jaw walls relieve their grip on said fruit, and friction applying means for applying a frictional force between said side walls and said jaw walls for resisting pivotal movement of said jaw walls relative to said side walls.

33. In a fruit processing apparatus, a frame, means in said frame for supporting a fruit to be cored, an elongated coring knife terminating in a fruit penetrating end, fruit engaging depth control means, means interconnecting said depth control means and said knife for movement of said control means longitudinally of the knife toward and away from said end thereof, means mounting said interconnecting means in said frame for moving said knife in the direction of its length toward and away from said supporting means for inserting said penetrating end into a fruit on said supporting means and for bringing said control means into engagement with said fruit, a rack on said frame, a pawl pivotally connected to said control means, and means for actuating said pawl into engagement with said rack as said control means approaches said supporting means for varying the spacing between said control means and said penetrating end.

References Cited by the Examiner

UNITED STATES PATENTS

| | | | |
|---|---|---|---|
| 2,187,075 | 1/40 | Coons | 146—52 X |
| 2,252,951 | 8/41 | Urschel et al. | 146—52 |
| 2,567,591 | 9/51 | Ashlock | 146—19 |
| 2,775,279 | 12/56 | Perrelli. | |
| 2,880,774 | 4/59 | Perrelli. | |
| 3,078,889 | 2/63 | Buchner | 146—52 X |

J. SPENCER OVERHOLSER, *Primary Examiner.*